US012443653B2

(12) United States Patent
Lin et al.

(10) Patent No.: US 12,443,653 B2
(45) Date of Patent: Oct. 14, 2025

(54) WEBPAGE MEDIA PLAYBACK

(71) Applicant: Sonos, Inc., Santa Barbara, CA (US)

(72) Inventors: Ted M. Lin, Ayer, MA (US); Eric M. Bass, Leominster, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/452,857

(22) Filed: Aug. 21, 2023

(65) Prior Publication Data
US 2024/0078259 A1    Mar. 7, 2024

Related U.S. Application Data

(63) Continuation of application No. 17/006,972, filed on Aug. 31, 2020, now Pat. No. 11,782,977, which is a
(Continued)

(51) Int. Cl.
*G06F 16/638* (2019.01)
*G06F 3/0481* (2022.01)
(Continued)

(52) U.S. Cl.
CPC .......... *G06F 16/638* (2019.01); *G06F 3/0481* (2013.01); *G06F 3/0482* (2013.01);
(Continued)

(58) Field of Classification Search
CPC .. G06F 16/638; G06F 16/4393; G06F 16/438; G06F 16/639; G06F 3/0481; G06F 3/0482; H04N 21/43615
See application file for complete search history.

(56) References Cited

U.S. PATENT DOCUMENTS

| 4,296,278 A | 10/1981 | Cullison et al. |
| 4,816,989 A | 3/1989 | Finn et al. |
| (Continued) | | |

FOREIGN PATENT DOCUMENTS

| CN | 1818901 A | 8/2006 |
| CN | 101410773 A | 4/2009 |
| (Continued) | | |

OTHER PUBLICATIONS

U.S. Appl. No. 12/070,933, filed Feb. 22, 2008. "System, Method, and Computer Program for Remotely Managing a Digital Device" Inventor: Jonathan Lang, et al.
(Continued)

*Primary Examiner* — William L Bashore
*Assistant Examiner* — Gregory A Distefano
(74) *Attorney, Agent, or Firm* — FORTEM IP LLP

(57) ABSTRACT

Examples described herein involve facilitating playback of media content via a webpage. An example implementation involves a computing device: identifying one or more playback zones including at least one respective playback device; transmitting, via a web browser, a webpage request; receiving a webpage that includes a link to a media item; modifying the received webpage to include a representation associated with the link; causing, via the web browser, display of the modified webpage; responsive to a selection of the representation, causing display of the option; and responsive to a selection of the option, causing display of a list of the one or more playback zones, wherein at least one playback zone of the one or more playback zones is selectable to cause the media item to be added to the playback queue associated with the at least one playback zone.

20 Claims, 6 Drawing Sheets

Related U.S. Application Data continuation of application No. 15/612,126, filed on Jun. 2, 2017, now Pat. No. 10,762,129, which is a continuation of application No. 14/197,403, filed on Mar. 5, 2014, now Pat. No. 9,679,054.

(51) Int. Cl.
*G06F 3/0482* (2013.01)
*G06F 16/438* (2019.01)
*H04N 21/436* (2011.01)

(52) U.S. Cl.
CPC ........ *G06F 16/438* (2019.01); *G06F 16/4393* (2019.01); *G06F 16/639* (2019.01); *H04N 21/43615* (2013.01)

(56) References Cited

U.S. PATENT DOCUMENTS

| | | |
|---|---|---|
| 5,182,552 A | 1/1993 | Paynting |
| 5,239,458 A | 8/1993 | Suzuki |
| 5,299,266 A | 3/1994 | Lumsden |
| 5,406,634 A | 4/1995 | Anderson et al. |
| 5,440,644 A | 8/1995 | Farinelli et al. |
| 5,467,342 A | 11/1995 | Logston et al. |
| 5,491,839 A | 2/1996 | Schotz |
| 5,553,222 A | 9/1996 | Milne et al. |
| 5,563,946 A | 10/1996 | Cooper et al. |
| 5,668,884 A | 9/1997 | Clair, Jr. et al. |
| 5,673,323 A | 9/1997 | Schotz et al. |
| 5,751,819 A | 5/1998 | Dorrough |
| 5,761,320 A | 6/1998 | Farinelli et al. |
| 5,774,666 A | 6/1998 | Portuesi |
| 5,808,662 A | 9/1998 | Kinney et al. |
| 5,815,689 A | 9/1998 | Shaw et al. |
| 5,856,827 A | 1/1999 | Sudo |
| 5,867,691 A | 2/1999 | Shiraishi |
| 5,875,354 A | 2/1999 | Charlton et al. |
| 5,887,143 A | 3/1999 | Saito et al. |
| 5,923,902 A | 7/1999 | Inagaki |
| 5,946,343 A | 8/1999 | Schotz et al. |
| 5,956,088 A | 9/1999 | Shen et al. |
| 6,002,862 A | 12/1999 | Takaike |
| 6,009,457 A | 12/1999 | Moller |
| 6,026,150 A | 2/2000 | Frank et al. |
| 6,031,818 A | 2/2000 | Lo et al. |
| 6,032,202 A | 2/2000 | Lea et al. |
| 6,108,686 A | 8/2000 | Williams, Jr. |
| 6,128,318 A | 10/2000 | Sato |
| 6,157,957 A | 12/2000 | Berthaud |
| 6,175,872 B1 | 1/2001 | Neumann et al. |
| 6,181,316 B1 | 1/2001 | Little et al. |
| 6,185,737 B1 | 2/2001 | Northcutt et al. |
| 6,195,436 B1 | 2/2001 | Scibora et al. |
| 6,199,169 B1 | 3/2001 | Voth |
| 6,255,961 B1 | 7/2001 | Van Ryzin et al. |
| 6,256,554 B1 | 7/2001 | DiLorenzo |
| 6,308,207 B1 | 10/2001 | Tseng et al. |
| 6,324,586 B1 | 11/2001 | Johnson |
| 6,332,147 B1 | 12/2001 | Moran et al. |
| 6,349,339 B1 | 2/2002 | Williams |
| 6,351,821 B1 | 2/2002 | Voth |
| 6,404,811 B1 | 6/2002 | Cvetko et al. |
| 6,430,353 B1 | 8/2002 | Honda et al. |
| 6,469,633 B1 | 10/2002 | Wachter |
| 6,487,296 B1 | 11/2002 | Allen et al. |
| 6,522,886 B1 | 2/2003 | Youngs et al. |
| 6,526,325 B1 | 2/2003 | Sussman et al. |
| 6,587,127 B1 | 7/2003 | Leeke et al. |
| 6,594,691 B1 | 7/2003 | McCollum et al. |
| 6,598,172 B1 | 7/2003 | Vandeusen et al. |
| 6,611,537 B1 | 8/2003 | Edens et al. |
| 6,631,410 B1 | 10/2003 | Kowalski et al. |
| 6,674,803 B1 | 1/2004 | Kesselring |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,836,788 B2 | 12/2004 | Kim et al. |
| 6,898,642 B2 | 5/2005 | Chafle et al. |
| 6,912,610 B2 | 6/2005 | Spencer |
| 6,920,373 B2 | 7/2005 | Xi et al. |
| 6,934,766 B1 | 8/2005 | Russell |
| 6,985,694 B1 | 1/2006 | De Bonet et al. |
| 7,007,106 B1 | 2/2006 | Flood et al. |
| 7,017,118 B1 | 3/2006 | Carroll |
| 7,020,048 B2 | 3/2006 | McComas |
| 7,020,791 B1 | 3/2006 | Aweya et al. |
| 7,043,651 B2 | 5/2006 | Aweya et al. |
| 7,047,308 B2 | 5/2006 | Deshpande |
| 7,113,833 B1 | 9/2006 | Brown et al. |
| 7,113,999 B2 | 9/2006 | Pestoni et al. |
| 7,115,017 B1 | 10/2006 | Laursen et al. |
| 7,117,451 B2 | 10/2006 | Sielken |
| 7,124,125 B2 | 10/2006 | Cook et al. |
| 7,130,608 B2 | 10/2006 | Hollstrom et al. |
| 7,130,616 B2 | 10/2006 | Janik |
| 7,143,141 B1 | 11/2006 | Morgan et al. |
| 7,143,939 B2 | 12/2006 | Henzerling |
| 7,162,315 B2 | 1/2007 | Gilbert |
| 7,185,090 B2 | 2/2007 | Kowalski et al. |
| 7,187,947 B1 | 3/2007 | White et al. |
| 7,206,367 B1 | 4/2007 | Moore |
| 7,209,795 B2 | 4/2007 | Sullivan et al. |
| 7,218,708 B2 | 5/2007 | Berezowski et al. |
| 7,236,739 B2 | 6/2007 | Chang |
| 7,236,773 B2 | 6/2007 | Thomas |
| 7,281,034 B1 | 10/2007 | Eyal |
| 7,293,060 B2 | 11/2007 | Komsi |
| 7,295,548 B2 | 11/2007 | Blank et al. |
| 7,302,468 B2 | 11/2007 | Wijeratne |
| 7,312,785 B2 | 12/2007 | Tsuk et al. |
| 7,324,857 B2 | 1/2008 | Goddard |
| 7,333,519 B2 | 2/2008 | Sullivan et al. |
| 7,358,960 B2 | 4/2008 | Mak |
| 7,372,846 B2 | 5/2008 | Zwack |
| 7,391,791 B2 | 6/2008 | Balassanian et al. |
| 7,392,102 B2 | 6/2008 | Sullivan et al. |
| 7,483,538 B2 | 1/2009 | McCarty et al. |
| 7,483,958 B1 | 1/2009 | Elabbady et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,574,274 B2 | 8/2009 | Holmes |
| 7,599,685 B2 | 10/2009 | Goldberg et al. |
| 7,630,501 B2 | 12/2009 | Blank et al. |
| 7,643,894 B2 | 1/2010 | Braithwaite et al. |
| 7,657,224 B2 | 2/2010 | Goldberg et al. |
| 7,657,644 B1 | 2/2010 | Zheng |
| 7,657,910 B1 | 2/2010 | McAulay et al. |
| 7,668,990 B2 | 2/2010 | Krzyzanowski et al. |
| 7,669,219 B2 | 2/2010 | Scott et al. |
| 7,675,943 B2 | 3/2010 | Mosig et al. |
| 7,676,142 B1 | 3/2010 | Hung |
| 7,702,279 B2 | 4/2010 | Ko et al. |
| 7,720,096 B2 | 5/2010 | Klemets |
| 7,725,533 B2 | 5/2010 | Szeto et al. |
| 7,725,551 B2 | 5/2010 | Szeto et al. |
| 7,739,271 B2 | 6/2010 | Cook et al. |
| 7,742,740 B2 | 6/2010 | Goldberg et al. |
| 7,788,138 B2 | 8/2010 | Mehmann et al. |
| 7,805,682 B1 | 9/2010 | Lambourne |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,885,622 B2 | 2/2011 | Krampf et al. |
| 7,899,915 B2 * | 3/2011 | Reisman ............... H04H 20/93 709/227 |
| 7,916,877 B2 | 3/2011 | Goldberg et al. |
| 7,917,082 B2 | 3/2011 | Goldberg et al. |
| 7,921,369 B2 | 4/2011 | Bill |
| 7,934,239 B1 | 4/2011 | Dagman |
| 7,987,294 B2 | 7/2011 | Bryce et al. |

(56) References Cited

U.S. PATENT DOCUMENTS

| | | | |
|---|---|---|---|
| 7,996,566 B1 | 8/2011 | Sylvain et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,074,253 B1 | 12/2011 | Nathan |
| 8,086,752 B2 | 12/2011 | Millington et al. |
| 8,103,009 B2 | 1/2012 | McCarty et al. |
| 8,112,032 B2 | 2/2012 | Ko et al. |
| 8,131,390 B2 | 3/2012 | Braithwaite et al. |
| 8,169,938 B2 * | 5/2012 | Duchscher et al. |
| 8,200,602 B2 | 6/2012 | Farrelly |
| 8,214,873 B2 | 7/2012 | Weel |
| 8,230,099 B2 | 7/2012 | Weel |
| 8,234,395 B2 | 7/2012 | Millington |
| 8,271,115 B2 | 9/2012 | Yoshida |
| 8,290,603 B1 | 10/2012 | Lambourne |
| 8,315,555 B2 | 11/2012 | Ko et al. |
| 8,370,678 B2 | 2/2013 | Millington et al. |
| 8,423,659 B2 | 4/2013 | Millington |
| 8,483,853 B1 | 7/2013 | Lambourne |
| 8,521,316 B2 | 8/2013 | Louboutin |
| 8,588,949 B2 | 11/2013 | Lambourne et al. |
| 8,613,385 B1 | 12/2013 | Hulet et al. |
| 8,666,826 B2 | 3/2014 | Narayanan et al. |
| 8,775,546 B2 | 7/2014 | Millington |
| 8,826,135 B1 | 9/2014 | Durham et al. |
| 8,843,500 B2 | 9/2014 | Nogues et al. |
| 8,892,648 B1 | 11/2014 | Durham et al. |
| 8,910,265 B2 | 12/2014 | Lang et al. |
| 8,942,252 B2 | 1/2015 | Balassanian et al. |
| 8,990,701 B2 | 3/2015 | Olofsson |
| 9,015,588 B2 | 4/2015 | Cassidy |
| 9,052,810 B2 | 6/2015 | Reimann et al. |
| 9,137,564 B2 | 9/2015 | Reimann |
| 9,165,255 B1 | 10/2015 | Shetty et al. |
| 9,229,938 B1 | 1/2016 | Jaini et al. |
| 9,246,866 B1 | 1/2016 | Sanders |
| 9,247,363 B2 | 1/2016 | Triplett et al. |
| 9,286,384 B2 | 3/2016 | Kuper et al. |
| 9,344,292 B2 | 5/2016 | Griffiths et al. |
| 9,374,607 B2 | 6/2016 | Bates et al. |
| 9,397,627 B2 * | 7/2016 | Qureshey | G06F 16/686 |
| 9,411,809 B1 | 8/2016 | Sabbavarapu et al. |
| 9,478,247 B2 | 10/2016 | Chen et al. |
| 9,489,383 B2 | 11/2016 | Hyman et al. |
| 9,510,055 B2 | 11/2016 | Kuper et al. |
| 9,524,338 B2 | 12/2016 | Van et al. |
| 9,654,821 B2 | 5/2017 | Coburn, IV et al. |
| 9,665,339 B2 | 5/2017 | Reimann et al. |
| 9,674,587 B2 | 6/2017 | Triplett et al. |
| 9,680,960 B2 | 6/2017 | Chen et al. |
| 9,696,874 B2 | 7/2017 | Kulick et al. |
| 9,703,521 B2 | 7/2017 | Kumar et al. |
| 9,715,500 B2 | 7/2017 | Cue et al. |
| 9,723,038 B2 | 8/2017 | Corbin et al. |
| 9,727,219 B2 | 8/2017 | Kumar et al. |
| 9,735,978 B2 | 8/2017 | Kumar et al. |
| 9,756,092 B2 | 9/2017 | Zhang et al. |
| 9,892,118 B2 | 2/2018 | Kumar et al. |
| 9,942,335 B2 | 4/2018 | Schneider et al. |
| 9,977,561 B2 | 5/2018 | Bates et al. |
| 10,032,233 B2 | 7/2018 | Papakipos et al. |
| 10,129,599 B2 | 11/2018 | Van Der Heide |
| 10,157,033 B2 | 12/2018 | Millington |
| 10,268,352 B2 | 4/2019 | Coburn, IV et al. |
| 10,275,135 B2 | 4/2019 | Coburn, IV et al. |
| 10,296,884 B2 | 5/2019 | Lang et al. |
| 10,313,761 B2 | 6/2019 | Alsina et al. |
| 10,469,897 B2 | 11/2019 | Reimann et al. |
| 11,223,661 B2 | 1/2022 | Corbin et al. |
| 11,539,767 B2 | 12/2022 | Corbin et al. |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0054134 A1 | 5/2002 | Kelts et al. |
| 2002/0056117 A1 | 5/2002 | Hasegawa et al. |
| 2002/0065926 A1 | 5/2002 | Hackney et al. |
| 2002/0072816 A1 | 6/2002 | Shdema et al. |
| 2002/0073228 A1 | 6/2002 | Cognet et al. |
| 2002/0090914 A1 | 7/2002 | Kang et al. |
| 2002/0093478 A1 | 7/2002 | Yeh |
| 2002/0109710 A1 | 8/2002 | Holtz et al. |
| 2002/0112244 A1 | 8/2002 | Liou et al. |
| 2002/0116476 A1 | 8/2002 | Eyal et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2002/0178191 A1 | 11/2002 | Sielken |
| 2002/0188762 A1 | 12/2002 | Tomassetti et al. |
| 2003/0002609 A1 | 1/2003 | Faller et al. |
| 2003/0020763 A1 | 1/2003 | Mayer et al. |
| 2003/0023741 A1 | 1/2003 | Tomassetti et al. |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0066094 A1 | 4/2003 | Van Der Schaar et al. |
| 2003/0088875 A1 | 5/2003 | Gay et al. |
| 2003/0099212 A1 | 5/2003 | Anjum et al. |
| 2003/0099221 A1 | 5/2003 | Rhee |
| 2003/0105820 A1 | 6/2003 | Haims et al. |
| 2003/0126211 A1 | 7/2003 | Anttila et al. |
| 2003/0157951 A1 | 8/2003 | Hasty, Jr. |
| 2003/0195964 A1 | 10/2003 | Mane |
| 2003/0198257 A1 | 10/2003 | Sullivan et al. |
| 2003/0210796 A1 | 11/2003 | McCarty et al. |
| 2003/0220973 A1 | 11/2003 | Zhu et al. |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0025185 A1 | 2/2004 | Goci et al. |
| 2004/0027166 A1 | 2/2004 | Mangum et al. |
| 2004/0032348 A1 | 2/2004 | Lai et al. |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0078812 A1 | 4/2004 | Calvert |
| 2004/0088328 A1 | 5/2004 | Cook et al. |
| 2004/0131192 A1 | 7/2004 | Metcalf |
| 2004/0170383 A1 | 9/2004 | Mazur |
| 2004/0203378 A1 | 10/2004 | Powers |
| 2004/0215611 A1 | 10/2004 | Jawa et al. |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2004/0261040 A1 | 12/2004 | Radcliffe et al. |
| 2005/0010691 A1 | 1/2005 | Oyadomari et al. |
| 2005/0013394 A1 | 1/2005 | Rausch et al. |
| 2005/0021590 A1 | 1/2005 | Debique et al. |
| 2005/0047605 A1 | 3/2005 | Lee et al. |
| 2005/0055716 A1 | 3/2005 | Louie et al. |
| 2005/0058149 A1 | 3/2005 | Howe |
| 2005/0081213 A1 | 4/2005 | Suzuoki et al. |
| 2005/0108320 A1 | 5/2005 | Lord et al. |

(56) References Cited

U.S. PATENT DOCUMENTS

| | | |
|---|---|---|
| 2005/0114538 A1 | 5/2005 | Rose |
| 2005/0125357 A1 | 6/2005 | Saadat et al. |
| 2005/0155072 A1 | 7/2005 | Kaczowka et al. |
| 2005/0166157 A1 | 7/2005 | Ollis et al. |
| 2005/0166258 A1 | 7/2005 | Vasilevsky et al. |
| 2005/0177643 A1 | 8/2005 | Xu |
| 2005/0181348 A1 | 8/2005 | Carey et al. |
| 2005/0195205 A1 | 9/2005 | Abrams |
| 2005/0201254 A1 | 9/2005 | Looney et al. |
| 2005/0234875 A1 | 10/2005 | Auerbach et al. |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2006/0095516 A1 | 5/2006 | Wijeratne |
| 2006/0107237 A1 | 5/2006 | Kim |
| 2006/0119497 A1 | 6/2006 | Miller et al. |
| 2006/0143236 A1 | 6/2006 | Wu |
| 2006/0168340 A1 | 7/2006 | Heller et al. |
| 2006/0195462 A1 | 8/2006 | Rogers |
| 2006/0195479 A1 | 8/2006 | Spiegelman et al. |
| 2006/0195480 A1 | 8/2006 | Spiegelman et al. |
| 2006/0248557 A1* | 11/2006 | Stark ................ H04N 21/4858 725/74 |
| 2006/0253436 A1 | 11/2006 | Cook et al. |
| 2006/0253782 A1 | 11/2006 | Stark et al. |
| 2006/0294074 A1 | 12/2006 | Chang |
| 2007/0033402 A1 | 2/2007 | Williams et al. |
| 2007/0038999 A1 | 2/2007 | Millington |
| 2007/0043847 A1 | 2/2007 | Carter et al. |
| 2007/0048713 A1 | 3/2007 | Plastina et al. |
| 2007/0049256 A1 | 3/2007 | Wassingbo |
| 2007/0054680 A1 | 3/2007 | Mo et al. |
| 2007/0088747 A1 | 4/2007 | Cheng et al. |
| 2007/0136778 A1 | 6/2007 | Birger et al. |
| 2007/0142022 A1 | 6/2007 | Madonna et al. |
| 2007/0142944 A1 | 6/2007 | Goldberg et al. |
| 2007/0143493 A1 | 6/2007 | Mullig et al. |
| 2007/0156883 A1 | 7/2007 | Thompson et al. |
| 2007/0169115 A1 | 7/2007 | Ko et al. |
| 2007/0180137 A1 | 8/2007 | Rajapakse |
| 2007/0214182 A1 | 9/2007 | Rosenberg |
| 2007/0224937 A1 | 9/2007 | Jung et al. |
| 2007/0250194 A1 | 10/2007 | Rhoads et al. |
| 2007/0271232 A1 | 11/2007 | Mattox et al. |
| 2007/0271388 A1 | 11/2007 | Bowra et al. |
| 2007/0288470 A1 | 12/2007 | Kauniskangas et al. |
| 2007/0294131 A1 | 12/2007 | Roman et al. |
| 2007/0299778 A1 | 12/2007 | Haveson et al. |
| 2008/0005690 A1 | 1/2008 | Van Vugt |
| 2008/0016465 A1 | 1/2008 | Foxenland |
| 2008/0022320 A1 | 1/2008 | Ver Steeg |
| 2008/0052371 A1 | 2/2008 | Partovi et al. |
| 2008/0059510 A1 | 3/2008 | Cardamore et al. |
| 2008/0077261 A1 | 3/2008 | Baudino et al. |
| 2008/0086368 A1 | 4/2008 | Bauman et al. |
| 2008/0086379 A1* | 4/2008 | Dion ................ G06Q 30/0235 705/14.1 |
| 2008/0091771 A1 | 4/2008 | Allen et al. |
| 2008/0109529 A1 | 5/2008 | Story |
| 2008/0120429 A1 | 5/2008 | Millington et al. |
| 2008/0144861 A1 | 6/2008 | Melanson et al. |
| 2008/0152165 A1 | 6/2008 | Zacchi |
| 2008/0154959 A1 | 6/2008 | Dunko |
| 2008/0194276 A1 | 8/2008 | Lin et al. |
| 2008/0301280 A1 | 12/2008 | Chasen et al. |
| 2008/0319833 A1 | 12/2008 | Svendsen |
| 2009/0005893 A1 | 1/2009 | Sugii et al. |
| 2009/0031336 A1 | 1/2009 | Chavez et al. |
| 2009/0041423 A1 | 2/2009 | Weber et al. |
| 2009/0063414 A1 | 3/2009 | White et al. |
| 2009/0076881 A1 | 3/2009 | Svendsen |
| 2009/0076917 A1 | 3/2009 | Jablokov et al. |
| 2009/0083117 A1 | 3/2009 | Svendsen et al. |
| 2009/0133069 A1 | 5/2009 | Conness et al. |
| 2009/0150806 A1 | 6/2009 | Evje et al. |
| 2009/0157905 A1 | 6/2009 | Davis |
| 2009/0175429 A1 | 7/2009 | Cohen et al. |
| 2009/0179867 A1 | 7/2009 | Shim et al. |
| 2009/0216855 A1 | 8/2009 | Lang et al. |
| 2009/0222115 A1 | 9/2009 | Malcolm et al. |
| 2009/0228919 A1 | 9/2009 | Zott et al. |
| 2009/0249222 A1 | 10/2009 | Schmidt et al. |
| 2009/0265426 A1 | 10/2009 | Svendsen et al. |
| 2009/0307062 A1 | 12/2009 | Lutnick et al. |
| 2009/0313369 A1 | 12/2009 | Wormington et al. |
| 2010/0010648 A1 | 1/2010 | Bull et al. |
| 2010/0017366 A1 | 1/2010 | Robertson et al. |
| 2010/0017714 A1 | 1/2010 | Agarwal et al. |
| 2010/0023578 A1 | 1/2010 | Brant et al. |
| 2010/0031366 A1 | 2/2010 | Knight et al. |
| 2010/0036950 A1 | 2/2010 | Bae et al. |
| 2010/0049835 A1 | 2/2010 | Ko et al. |
| 2010/0054275 A1 | 3/2010 | Noonan et al. |
| 2010/0070490 A1 | 3/2010 | Amidon et al. |
| 2010/0082731 A1 | 4/2010 | Haughay et al. |
| 2010/0094728 A1 | 4/2010 | Denning et al. |
| 2010/0094834 A1 | 4/2010 | Svendsen |
| 2010/0095332 A1 | 4/2010 | Gran et al. |
| 2010/0131567 A1 | 5/2010 | Dorogusker et al. |
| 2010/0162324 A1 | 6/2010 | Mehta et al. |
| 2010/0185671 A1 | 7/2010 | Burba et al. |
| 2010/0205222 A1 | 8/2010 | Gajdos et al. |
| 2010/0228740 A1 | 9/2010 | Cannistraro et al. |
| 2010/0235520 A1 | 9/2010 | Attanasio et al. |
| 2010/0262909 A1 | 10/2010 | Hsieh |
| 2010/0284389 A1 | 11/2010 | Ramsay et al. |
| 2010/0299391 A1 | 11/2010 | Demarta et al. |
| 2010/0299639 A1 | 11/2010 | Ramsay et al. |
| 2010/0318917 A1 | 12/2010 | Holladay et al. |
| 2010/0325218 A1 | 12/2010 | Castro et al. |
| 2010/0332326 A1 | 12/2010 | Ishai |
| 2011/0004330 A1 | 1/2011 | Rothkopf et al. |
| 2011/0041080 A1 | 2/2011 | Fleischman et al. |
| 2011/0066941 A1 | 3/2011 | Chipchase et al. |
| 2011/0066943 A1 | 3/2011 | Brillon et al. |
| 2011/0087842 A1 | 4/2011 | Lu et al. |
| 2011/0119706 A1 | 5/2011 | Scott et al. |
| 2011/0154173 A1 | 6/2011 | Herlein |
| 2011/0196888 A1 | 8/2011 | Hanson et al. |
| 2011/0202430 A1 | 8/2011 | Narayanan et al. |
| 2011/0202842 A1 | 8/2011 | Weatherly et al. |
| 2011/0211534 A1 | 9/2011 | Schmidt et al. |
| 2011/0225417 A1 | 9/2011 | Maharajh et al. |
| 2011/0238755 A1 | 9/2011 | Khan et al. |
| 2011/0246383 A1 | 10/2011 | Gibson et al. |
| 2011/0264732 A1 | 10/2011 | Robbin et al. |
| 2011/0314388 A1 | 12/2011 | Wheatley |
| 2012/0029671 A1 | 2/2012 | Millington et al. |
| 2012/0030366 A1 | 2/2012 | Collart et al. |
| 2012/0054278 A1 | 3/2012 | Taleb et al. |
| 2012/0059495 A1 | 3/2012 | Weiss et al. |
| 2012/0060046 A1 | 3/2012 | Millington |
| 2012/0071996 A1 | 3/2012 | Svendsen |
| 2012/0096526 A1 | 4/2012 | Brahmanapalli et al. |
| 2012/0112986 A1 | 5/2012 | McCoy et al. |
| 2012/0117168 A1 | 5/2012 | Sugiyama et al. |
| 2012/0117185 A1 | 5/2012 | Cassidy |
| 2012/0117586 A1 | 5/2012 | McCoy et al. |
| 2012/0124176 A1 | 5/2012 | Curtis et al. |
| 2012/0129446 A1 | 5/2012 | Ko et al. |
| 2012/0151320 A1 | 6/2012 | McClements, IV |
| 2012/0158531 A1 | 6/2012 | Dion et al. |
| 2012/0159393 A1 | 6/2012 | Sethi et al. |
| 2012/0206623 A1 | 8/2012 | Nakama |
| 2012/0210205 A1 | 8/2012 | Sherwood et al. |
| 2012/0210377 A1 | 8/2012 | Wong et al. |
| 2012/0216296 A1 | 8/2012 | Kidron |
| 2012/0221951 A1 | 8/2012 | Kidron |
| 2012/0233067 A1 | 9/2012 | Matthew et al. |
| 2012/0233639 A1 | 9/2012 | Zott et al. |
| 2012/0263318 A1 | 10/2012 | Millington et al. |
| 2012/0272156 A1 | 10/2012 | Kerger et al. |
| 2012/0284423 A1 | 11/2012 | Weel et al. |

(56) References Cited

U.S. PATENT DOCUMENTS

| | | | |
|---|---|---|---|
| 2012/0311635 A1 | 12/2012 | Mushkatblat et al. | |
| 2012/0315884 A1 | 12/2012 | Forutanpour et al. | |
| 2012/0331386 A1 | 12/2012 | Hicken et al. | |
| 2013/0007617 A1 | 1/2013 | MacKenzie et al. | |
| 2013/0024880 A1 | 1/2013 | Moloney-Egnatios et al. | |
| 2013/0031162 A1 | 1/2013 | Willis et al. | |
| 2013/0061296 A1 | 3/2013 | Reddy et al. | |
| 2013/0070093 A1 | 3/2013 | Rivera et al. | |
| 2013/0073584 A1 | 3/2013 | Kuper et al. | |
| 2013/0073979 A1 | 3/2013 | Shepherd et al. | |
| 2013/0080599 A1 | 3/2013 | Ko et al. | |
| 2013/0080955 A1 | 3/2013 | Reimann et al. | |
| 2013/0081110 A1 | 3/2013 | McGowan | |
| 2013/0094667 A1* | 4/2013 | Millington | H04N 21/4852 381/104 |
| 2013/0128038 A1 | 5/2013 | Cok et al. | |
| 2013/0129232 A1 | 5/2013 | Cok et al. | |
| 2013/0130729 A1 | 5/2013 | Cok et al. | |
| 2013/0159858 A1 | 6/2013 | Joffray et al. | |
| 2013/0166649 A1 | 6/2013 | Atzmon et al. | |
| 2013/0173531 A1 | 7/2013 | Rinearson et al. | |
| 2013/0173794 A1 | 7/2013 | Agerbak et al. | |
| 2013/0174204 A1 | 7/2013 | Coburn, IV et al. | |
| 2013/0191454 A1 | 7/2013 | Oliver et al. | |
| 2013/0198633 A1 | 8/2013 | Hyman | |
| 2013/0205243 A1 | 8/2013 | Rivera et al. | |
| 2013/0221951 A1 | 8/2013 | Anderson et al. | |
| 2013/0246522 A1 | 9/2013 | Bilinski et al. | |
| 2013/0254663 A1 | 9/2013 | Bates et al. | |
| 2013/0275611 A1 | 10/2013 | Somekh et al. | |
| 2013/0297686 A1 | 11/2013 | Bilinski et al. | |
| 2013/0310316 A1 | 11/2013 | Hellstrom et al. | |
| 2013/0317936 A1 | 11/2013 | Hughes | |
| 2013/0339397 A1 | 12/2013 | Herasymchuk | |
| 2013/0339589 A1 | 12/2013 | Qawami et al. | |
| 2013/0343567 A1 | 12/2013 | Triplett et al. | |
| 2013/0346859 A1 | 12/2013 | Bates et al. | |
| 2014/0006483 A1 | 1/2014 | Garmark et al. | |
| 2014/0006947 A1* | 1/2014 | Garmark | G06F 3/0484 715/716 |
| 2014/0025688 A1 | 1/2014 | Andler et al. | |
| 2014/0047074 A1 | 2/2014 | Chung et al. | |
| 2014/0052770 A1 | 2/2014 | Gran et al. | |
| 2014/0059431 A1 | 2/2014 | Svendsen et al. | |
| 2014/0067828 A1 | 3/2014 | Archibong et al. | |
| 2014/0067998 A1 | 3/2014 | Garcia et al. | |
| 2014/0075308 A1 | 3/2014 | Sanders et al. | |
| 2014/0075316 A1 | 3/2014 | Li | |
| 2014/0081796 A1 | 3/2014 | Cohen | |
| 2014/0093219 A1 | 4/2014 | Trivedi | |
| 2014/0108528 A1 | 4/2014 | Papakipos et al. | |
| 2014/0108929 A1 | 4/2014 | Garmark et al. | |
| 2014/0115061 A1 | 4/2014 | Reddy et al. | |
| 2014/0122590 A1 | 5/2014 | Svendsen | |
| 2014/0146982 A1 | 5/2014 | Pelosi | |
| 2014/0157300 A1 | 6/2014 | Childs et al. | |
| 2014/0188911 A1 | 7/2014 | Skeen et al. | |
| 2014/0201197 A1 | 7/2014 | Kumar et al. | |
| 2014/0201632 A1 | 7/2014 | Kunigita et al. | |
| 2014/0204076 A1 | 7/2014 | Kuper et al. | |
| 2014/0208205 A1 | 7/2014 | Bartholomew | |
| 2014/0222830 A1 | 8/2014 | Ringer et al. | |
| 2014/0223099 A1 | 8/2014 | Kidron | |
| 2014/0237361 A1 | 8/2014 | Martin et al. | |
| 2014/0244863 A1 | 8/2014 | Bradley et al. | |
| 2014/0282755 A1 | 9/2014 | Alsina et al. | |
| 2014/0310058 A1 | 10/2014 | Aral et al. | |
| 2014/0310779 A1 | 10/2014 | Lof et al. | |
| 2014/0330951 A1 | 11/2014 | Sukoff et al. | |
| 2014/0337959 A1 | 11/2014 | Garmark et al. | |
| 2014/0341528 A1 | 11/2014 | Mahate et al. | |
| 2014/0359680 A1 | 12/2014 | Shivadas et al. | |
| 2015/0039620 A1 | 2/2015 | Ning | |
| 2015/0046458 A1 | 2/2015 | Hu | |
| 2015/0066892 A1 | 3/2015 | Astore | |
| 2015/0067054 A1 | 3/2015 | Yoo et al. | |
| 2015/0067871 A1 | 3/2015 | Commons et al. | |
| 2015/0074534 A1 | 3/2015 | Didomenico et al. | |
| 2015/0095680 A1 | 4/2015 | Gossain et al. | |
| 2015/0113058 A1 | 4/2015 | Zhang et al. | |
| 2015/0121220 A1 | 4/2015 | Lee et al. | |
| 2015/0128162 A1 | 5/2015 | Ionescu et al. | |
| 2015/0185599 A1 | 7/2015 | Mullins | |
| 2015/0186110 A1 | 7/2015 | Kannan | |
| 2015/0220498 A1 | 8/2015 | Munoz et al. | |
| 2015/0242597 A1 | 8/2015 | Danciu | |
| 2015/0278357 A1 | 10/2015 | Wang | |
| 2015/0286360 A1 | 10/2015 | Wachter | |
| 2015/0331940 A1 | 11/2015 | Manning | |
| 2016/0063011 A1 | 3/2016 | Wehbi et al. | |
| 2016/0077710 A1 | 3/2016 | Lewis et al. | |
| 2016/0082348 A1 | 3/2016 | Kehoe et al. | |
| 2016/0147501 A1 | 5/2016 | Gilbert | |
| 2016/0180248 A1 | 6/2016 | Regan | |
| 2016/0253145 A1 | 9/2016 | Lee et al. | |
| 2017/0093943 A1 | 3/2017 | Alsina et al. | |
| 2017/0161119 A1 | 6/2017 | Boyle et al. | |
| 2017/0169522 A1 | 6/2017 | Hyman et al. | |
| 2017/0236512 A1 | 8/2017 | Williams et al. | |

FOREIGN PATENT DOCUMENTS

| | | |
|---|---|---|
| CN | 101427316 A | 5/2009 |
| CN | 101714156 A | 5/2010 |
| CN | 101910992 A | 12/2010 |
| CN | 102450032 A | 5/2012 |
| CN | 102656898 A | 9/2012 |
| CN | 102947827 A | 2/2013 |
| CN | 104126309 A | 10/2014 |
| EP | 0251584 A2 | 1/1988 |
| EP | 0672985 A1 | 9/1995 |
| EP | 1111527 A2 | 6/2001 |
| EP | 1389853 A1 | 2/2004 |
| JP | 2004354721 A | 12/2004 |
| JP | 2007520808 A | 7/2007 |
| JP | 2009540638 A | 11/2009 |
| JP | 2010141748 A | 6/2010 |
| JP | 2011128957 | 6/2011 |
| JP | 2011223124 A | 11/2011 |
| KR | 20010090215 | 10/2001 |
| KR | 20050051785 | 6/2005 |
| KR | 1020070040592 | 4/2007 |
| KR | 20070048922 | 5/2007 |
| KR | 100890993 | 3/2009 |
| KR | 20100060498 A | 6/2010 |
| KR | 20100071724 | 6/2010 |
| KR | 20100134164 | 12/2010 |
| KR | 20110064635 | 6/2011 |
| KR | 20130083012 A | 7/2013 |
| WO | 199525313 | 9/1995 |
| WO | 199961985 | 12/1999 |
| WO | 200147248 | 6/2001 |
| WO | 200153994 | 7/2001 |
| WO | 02052540 A1 | 7/2002 |
| WO | 2002052540 | 7/2002 |
| WO | 2003093950 A2 | 11/2003 |
| WO | 2005013047 A2 | 2/2005 |
| WO | 2005079071 A1 | 8/2005 |
| WO | 2007023120 A1 | 3/2007 |
| WO | 2010018429 A1 | 2/2010 |
| WO | 2011100264 A3 | 11/2011 |
| WO | 2011157891 A1 | 12/2011 |
| WO | 2012050927 A2 | 4/2012 |
| WO | 2012056326 A2 | 5/2012 |
| WO | 2012106269 | 8/2012 |
| WO | 2012170205 A1 | 12/2012 |
| WO | 2013139239 A1 | 9/2013 |
| WO | 2014004181 | 1/2014 |
| WO | 2014116693 A1 | 7/2014 |
| WO | 2014145746 | 9/2014 |

(56) References Cited

OTHER PUBLICATIONS

U.S. Application No. 13/533, 105 filed on Jun. 26, 2012. "Systems, Methods, Apparatus, and Articles of Manufacture to Provide a Crowd-Sourced Playlist with Guess Access" Inventor: Paul Bates, et al.
U.S. Appl. No. 13/533,785, filed Jun. 26, 2012. "Networked Music Playback Including Remote Discovery and Add to Queue" Inventor: Mark Triplett, et al.
U.S. Appl. No. 13/748,357, filed Jan. 23, 2013. "System and Method for a Media Experience Social Interface" Inventor: Ron Kuper, et al.
U.S. Appl. No. 13/871,785, filed Apr. 26, 2013. "Systems, Methods, Apparatus, and Articles of Manufacture to Provide Guest Access" Inventor: Paul Bates, et al.
U.S. Appl. No. 13/871,795, filed Jun. 20, 2013. "Systems, Methods, Apparatus, and Articles of Manufacture to Provide Guest Access" Inventor: Paul Bates, et al.
U.S. Appl. No. 14/173,253, filed Feb. 5, 2014. "Remote Creation of a Playback Queue for a Future Event" Inventor: Jaime Munoz, et al.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 32 manual: copyright 2001.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
First Action Interview Pilot Program Pre-Interview Communication mailed on Oct. 28, 2015, issued in connection with U.S. Appl. No. 14/275,112, filed May 12, 2014, 4 pages.
First Action Interview Pilot Program Pre-Interview Communication mailed on Apr. 3, 2017, issued in connection with U. S. U.S. Appl. No. 14/495,590, filed Sep. 24, 2014, 5 pages.
Huang C.M., et al., "A Synchronization Infrastructure for Multicast Multimedia at the Presentation Layer," IEEE Transactions on Consumer Electronics, 1997, pp. 370-380, vol. 43, No. 3.
International Bureau, International Preliminary Report on Patentability mailed Jan. 30, 2014, issued in connection with International Application No. PCT/US2012/047620, filed on Jul. 20, 2012, 7 pages.
International Bureau, International Preliminary Report on Patentability mailed on Apr. 3, 2014, issued in connection with International Application No. PCT/US2012/056467, filed on Sep. 21, 2011, 11 pages.
International Bureau, International Preliminary Report on Patentability, mailed on Aug. 6, 2015, issued in connection with International Application No. PCT/US2014/012534, filed on Jan. 22, 2014, 6 pages.
International Bureau, International Preliminary Report on Patentability mailed on Dec. 15, 2016, issued in connection with International Application No. PCT/US2015/031934, filed on May 21, 2015, 11 pages.
International Bureau, International Preliminary Report on Patentability mailed on Aug. 18, 2016, issued in connection with International Application No. PCT/US2015/014156, filed on Feb. 3, 2015, 10 pages.
International Bureau, International Preliminary Report on Patentability mailed on Sep. 15, 2016, issued in connection with International Application No. PCT/US2015/018850, filed on Mar. 5, 2015, 10 pages.
International Searching Authority, International Preliminary Report on Patentability mailed on Apr. 6, 2017, issued in connection with International Application No. PCT/US2015/051968 filed on Sep. 24, 2015, 10 pages.
International Searching Authority, International Preliminary Report on Patentability mailed on Apr. 6, 2017, issued in connection with International Application No. PCT/US2015/051975 filed on Sep. 24, 2015, 9 pages.
International Searching Authority, International Preliminary Report on Patentability mailed on Apr. 6, 2017, issued in connection with International Application No. PCT/US2015/051983 filed on Sep. 24, 2015, 7 pages.
International Searching Authority, International Preliminary Report on Patentability mailed on Apr. 6, 2017, issued in connection with International Application No. PCT/US2015/051989 filed on Sep. 24, 2015, 7 pages.
International Searching Authority, International Preliminary Report on Patentability mailed on Apr. 6, 2017, issued in connection with International Application No. PCT/US2015/051993 filed on Sep. 24, 2015, 8 pages.
International Searching Authority, International Preliminary Report on Patentability mailed on Feb. 23, 2017, issued in connection with International Application No. PCT/US2015/044218, filed on Aug. 7, 2015, 10 pages.
International Searching Authority, International Search Report and Written Opinion mailed on Nov. 6, 2015, issued in connection with International Application No. PCT/US2015/051993, filed on Sep. 24, 2015, 10 pages.
International Searching Authority, International Search Report and Written Opinion mailed on Dec. 7, 2015, issued in connection with International Application No. PCT/US2015/051968, filed on Sep. 24, 2015, 14 pages.
International Searching Authority, International Search Report and Written Opinion mailed on Dec. 16, 2015, issued in connection with International Application No. PCT/US2015/051989 filed on Sep. 24, 2015, 11 pages.
International Searching Authority, International Search Report and Written Opinion mailed on Dec. 21, 2015, issued in connection with International Application No. PCT/US2015/051983 filed on Sep. 24, 2015, 11 pages.
International Searching Authority, International Search Report and Written Opinion mailed on Nov. 23, 2015, issued in connection with International Application No. PCT/US2015/051975, filed on Sep. 24, 2015, 14 pages.
International Searching Authority, International Search Report and Written Opinion mailed on Apr. 24, 2015, issued in connection with International Application No. PCT/US2015/014156, filed on Feb. 3, 2015, 13 pages.
International Searching Authority, International Search Report and Written Opinion mailed on Aug. 27, 2015, issued in connection with International Application No. PCT/US2015/031934, filed on May 21, 2015, 14 pages.
International Searching Authority, International Search Report and Written Opinion mailed on Nov. 27, 2015, issued in connection with International Application No. PCT/US2015/044218, filed on Aug. 7, 2015, 13 pages.
International Searching Authority, International Search Report and Written Opinion mailed on May 29, 2015, issued in connection with International Application No. PCT/US2015/018850, filed on Mar. 5, 2015, 13 pages.
International Searching Authority, International Search Report mailed May 8, 2014, issued in connection with International Application No. PCT/US2014/012534, filed on Jan. 24, 2014, 3 pages.
International Searching Authority, International Search Report mailed on Dec. 27, 2012, issued in connection with International Application No. PCT/US2012/047620, filed on Jul. 20, 2011, 3 pages.
International Searching Authority, Written Opinion mailed on Dec. 27, 2012, issued in connection with International Application No. PCT/US2012/047620, filed on Jul. 20, 2011, 5 pages.
International Searhing Authority, International Search Report and Written Opinion mailed on Feb. 28, 2013, issued in connection with International Application No. PCT/US2012/056467, filed on Sep. 21, 2012, 12 pages.
Ishibashi et al., "A Group Synchronization Mechanism for Live Media in Multicast Communications," IEEE Global Telecommunications Conference, 1997, pp. 746-752, vol. 2.

(56) References Cited

OTHER PUBLICATIONS

Ishibashi et al., "A Group Synchronization Mechanism for Stored Media in Multicast Communications," IEEE Information Revolution and Communications, 1997, pp. 692-700, vol. 2.
Japanese Patent Office, Full English Translation of Office Action mailed on Nov. 28, 2017, issued in connection with Japanese Patent Application No. 2016-555529, 2 pages.
Japanese Patent Office, Notice of Rejection mailed on Nov. 8, 2016, issued in connection with Japanese Application No. 2015-555237, 6 pages.
Japanese Patent Office, Office Action mailed on Nov. 28, 2017, issued in connection with Japanese Patent Application No. 2016-555529, 5 pages.
Japanese Patent Office, Office Action mailed on Nov. 7, 2017, issued in connection with Japanese Patent Application No. 2016-550231, 5 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Mills David L., "Network Time Protocol (Version 3) Specification, Implementation and Analysis," Network Working Group, Mar. 1992, 7 pages.
Mills, David L., "Precision Synchronization of Computer Network Clocks," ACM SIGCOMM Computer Communication Review, 1994, pp. 28-43, vol. 24, No. 2.
Motorola, "Simplefi, Wireless Digital Audio Receiver, Installation and User Guide," Dec. 31, 2001, 111 pages.
Nilsson, M., "ID3 Tag Version 2," Mar. 26, 1998, 28 pages.
Non-Final Office Action mailed on Nov. 1, 2016, issued in connection with U.S. Appl. No. 14/173,253, filed Feb. 5, 2014, 21 pages.
Non-Final Office Action mailed on Oct. 1, 2015, issued in connection with U.S. Appl. No. 13/748,357, filed Jan. 23, 2013, 18 pages.
Non-Final Office Action mailed on Oct. 3, 2017, issued in connection with U.S. Appl. No. 14/495,633, filed Sep. 24, 2014, 18 pages.
Non-Final Office Action mailed on Apr. 6, 2016, issued in connection with U.S. Appl. No. 14/297,193, filed Jun. 5, 2014, 26 pages.
Non-Final Office Action mailed on May 6, 2015, issued in connection with U.S. Appl. No. 13/748,357, filed Jan. 23, 2013, 17 pages.
Non-Final Office Action mailed on Mar. 1, 2023, issued in connection with U.S. Appl. No. 17/485,901, filed Sep. 27, 2021, 15 pages.
Non-Final Office Action mailed on Jul. 10, 2017, issued in connection with U.S. Appl. No. 14/297,193, filed Jun. 5, 2014, 33 pages.
Non-Final Office Action mailed on Sep. 10, 2015, issued in connection with U.S. Appl. No. 14/197,403, filed Mar. 5, 2014, 16 pages.
Non-Final Office Action mailed on Jan. 12, 2017, issued in connection with U.S. Appl. No. 14/275,112, filed May 12, 2014, 25 pages.
European Patent Office, Office Action mailed on Apr. 4, 2017, issued in connection with European Application No. 15775897.0, 6 pages.
European Patent Office, Office Action mailed on Jan. 13, 2017, issued in connection with European Application No. 15781794.1, 8 pages.
European Patent Office, Office Action mailed on Mar. 13, 2017, issued in connection with European Application No. 15781200.9, 5 pages.
European Patent Office, Summons to Attend Oral Proceedings mailed on Jun. 11, 2019, issued in connection with European Application No. 14743335.3, 10 pages.
European Patent Office, Summons to Attend Oral Proceedings mailed on Nov. 20, 2020, issued in connection with European Application No. 15829058.5, 7 pages.
European Patent Office, Summons to Attend Oral Proceedings mailed on Mar. 27, 2018, issued in connection with European Patent Application No. 15781794.1, 11 pages.
European Patent Office, Summons to Oral Proceedings mailed on Apr. 11, 2022, issued in connection with European Application No. 15781794.1, 2 pages.
Final Office Action mailed on Nov. 2, 2017, issued in connection with U.S. Appl. No. 14/275,112, filed May 12, 2014, 20 pages.
Final Office Action mailed on Oct. 2, 2019, issued in connection with U.S. Appl. No. 14/297,193, filed Jun. 5, 2014, 47 pages.
Final Office Action mailed on Nov. 3, 2016, issued in connection with U.S. Appl. No. 14/495,684, filed Sep. 24, 2014, 16 pages.
Final Office Action mailed on Oct. 3, 2019, issued in connection with U.S. Appl. No. 16/174,703, filed Oct. 30, 2018, 17 pages.
Final Office Action mailed on Apr. 6, 2016, issued in connection with U.S. Appl. No. 14/173,253, filed Feb. 5, 2014, 20 pages.
Final Office Action mailed on Feb. 7, 2017, issued in connection with U.S. Appl. No. 14/455,651, filed Aug. 8, 2014, 22 pages.
Final Office Action mailed on Oct. 7, 2016, issued in connection with U.S. Appl. No. 14/495,595, filed Sep. 24, 2014, 16 pages.
Final Office Action mailed on Nov. 8, 2016, issued in connection with U.S. Appl. No. 14/495,659, filed Sep. 24, 2014, 14 pages.
Final Office Action mailed on Feb. 1, 2024, issued in connection with U.S. Appl. No. 18/067,720, filed Dec. 18, 2022, 25 pages.
Final Office Action mailed on Feb. 10, 2016, issued in connection with U.S. Appl. No. 14/197,403, filed Mar. 5, 2014, 21 pages.
Final Office Action mailed on Feb. 11, 2020, issued in connection with U.S. Appl. No. 15/595,519, filed May 15, 2017, 15 pages.
Final Office Action mailed on Feb. 16, 2017, issued in connection with U.S. Appl. No. 14/495,633, filed Sep. 24, 2014, 15 pages.
Final Office Action mailed on May 16, 2023, issued in connection with U.S. Appl. No. 17/822,851, filed Aug. 29, 2022, 21 pages.
Final Office Action mailed on Sep. 16, 2016, issued in connection with U.S. Appl. No. 14/275,112, filed May 12, 2014, 19 pages.
Final Office Action mailed on Jan. 19, 2018, issued in connection with U.S. Appl. No. 14/297,193, filed Jun. 5, 2014, 32 pages.
Final Office Action mailed on Oct. 19, 2022, issued in connection with U.S. Appl. No. 17/536,408, filed Nov. 29, 2021, 8 pages.
Final Office Action mailed on Jan. 2, 2019, issued in connection with U.S. Appl. No. 15/595,519, filed May 15, 2017, 14 pages.
Final Office Action mailed on Aug. 20, 2019, issued in connection with U.S. Appl. No. 15/607,267, filed May 26, 2017, 19 pages.
Final Office Action mailed on Oct. 20, 2016, issued in connection with U.S. Appl. No. 14/197,403, filed Mar. 5, 2016, 17 pages.
Final Office Action mailed on Dec. 22, 2022, issued in connection with U.S. Appl. No. 17/006,972, filed Aug. 31, 2020, 16 pages.
Final Office Action mailed on Dec. 26, 2023, issued in connection with U.S. Appl. No. 17/822,851, filed Aug. 29, 2022, 22 pages.
Final Office Action mailed on Mar. 28, 2018, issued in connection with U.S. Appl. No. 14/495,633, filed Sep. 24, 2014, 21 pages.
Final Office Action mailed on Oct. 29, 2018, issued in connection with U.S. Appl. No. 15/607,267, filed May 26, 2017, 17 pages.
Final Office Action mailed on Sep. 3, 2020, issued in connection with U.S. Appl. No. 15/664,634, filed Jul. 31, 2017, 24 pages.
Final Office Action mailed on Jun. 30, 2023, issued in connection with U.S. Appl. No. 17/536,408, filed Nov. 29, 2021, 8 pages.
Final Office Action mailed on Sep. 30, 2016, issued in connection with U.S. Appl. No. 14/297,193, filed Jun. 5, 2014, 34 pages.
Final Office Action mailed on Dec. 31, 2020, issued in connection with U.S. Appl. No. 14/297,193, filed Jun. 5, 2014, 26 pages.
Final Office Action mailed on Jul. 31, 2019, issued in connection with U.S. Appl. No. 15/664,634, filed Jul. 31, 2017, 16 pages.
Final Office Action mailed on May 31, 2017, issued in connection with U.S. Appl. No. 14/173,253, filed Feb. 5, 2014, 22 pages.
Final Office Action mailed on May 31, 2017, issued in connection with U.S. Appl. No. 14/821,513, filed Aug. 7, 2015, 16 pages.
Final Office Action mailed on Jul. 5, 2019, issued in connection with U.S. Appl. No. 14/495,633, filed Sep. 24, 2014, 16 pages.
Final Office Action mailed on Jul. 5, 2019, issued in connection with U.S. Appl. No. 15/966,337, filed Apr. 30, 2018, 16 pages.
Final Office Action mailed on Jun. 7, 2021, issued in connection with U.S. Appl. No. 16/866,159, filed May 4, 2020, 14 pages.

(56) References Cited

OTHER PUBLICATIONS

Final Office Action mailed on Sep. 8, 2023, issued in connection with U.S. Appl. No. 17/485,901, filed Sep. 27, 2021, 17 pages.
First Action Interview Office Action mailed on Apr. 4, 2016, issued in connection with U.S. Appl. No. 14/275,112, filed May 12, 2014, 8 pages.
First Action Interview Office Action mailed on Jul. 7, 2016, issued in connection with U.S. Appl. No. 14/495,595, filed Sep. 24, 2014, 6 pages.
First Action Interview Office Action mailed on Jul. 11, 2016, issued in connection with U.S. Appl. No. 14/495,684, filed Sep. 24, 2014, 8 pages.
First Action Interview Office Action mailed on Jul. 13, 2016, issued in connection with U.S. Appl. No. 14/455,651, filed Aug. 8, 2014, 10 pages.
First Action Interview Office Action mailed on Oct. 13, 2016, issued in connection with U.S. Appl. No. 14/495,633, filed Sep. 24, 2014, 8 pages.
First Action Interview Office Action mailed on Dec. 14, 2016, issued in connection with U.S. Appl. No. 14/821,513, filed Aug. 7, 2015, 10 pages.
First Action Interview Office Action mailed on Nov. 14, 2019, issued in connection with U.S. Appl. No. 16/188,186, filed Nov. 12, 2018, 14 pages.
First Action Interview Office Action mailed on Jan. 17, 2020, issued in connection with U.S. Appl. No. 16/188,186, filed Nov. 12, 2018, 14 pages.
First Action Interview Office Action mailed on Jul. 22, 2016, issued in connection with U.S. Appl. No. 14/495,659, filed Sep. 24, 2014, 8 pages.
Notice of Allowance mailed on Feb. 11, 2019, issued in connection with U.S. Appl. No. 16/143,301, filed Sep. 26, 2018, 15 pages.
Notice of Allowance mailed on May 11, 2022, issued in connection with U.S. Appl. No. 17/340,370, filed Jun. 7, 2021, 12 pages.
Notice of Allowance mailed on Jan. 12, 2017, issued in connection with U.S. Appl. No. 14/495,595, filed Sep. 24, 2014, 5 pages.
Notice of Allowance mailed on Apr. 13, 2022, issued in connection with U.S. Appl. No. 17/131,001, filed Dec. 22, 2020, 8 pages.
Notice of Allowance mailed on Sep. 13, 2023, issued in connection with U.S. Appl. No. 17/930,917, filed Sep. 9, 2022, 11 pages.
Notice of Allowance mailed on Dec. 17, 2019, issued in connection with U.S. Appl. No. 16/174,703, filed Oct. 30, 2018, 11 pages.
Notice of Allowance mailed on Jan. 17, 2020, issued in connection with U.S. Appl. No. 15/612,126, filed Jun. 2, 2017, 5 pages.
Notice of Allowance mailed on Jul. 18, 2018, issued in connection with U.S. Appl. No. 15/227,074, filed Aug. 3, 2016, 8 pages.
Notice of Allowance mailed on Sep. 19, 2017, issued in connection with U.S. Appl. No. 14/455,651, filed Aug. 8, 2014, 12 pages.
Notice of Allowance mailed on Aug. 20, 2020, issued in connection with U.S. Appl. No. 15/607,267, filed May 26, 2017, 8 pages.
Notice of Allowance mailed on Sep. 20, 2021, issued in connection with U.S. Appl. No. 17/129,060, filed Dec. 21, 2020, 9 pages.
Notice of Allowance mailed on Jul. 21, 2020, issued in connection with U.S. Appl. No. 15/966,337, filed Apr. 30, 2018, 11 pages.
Notice of Allowance mailed on Aug. 24, 2017, issued in connection with U.S. Appl. No. 14/495,590, filed Sep. 24, 2014, 10 pages.
Notice of Allowance mailed on Aug. 24, 2020, issued in connection with U.S. Appl. No. 16/516,767, filed Jul. 19, 2019, 9 pages.
Notice of Allowance mailed on Jan. 26, 2017, issued in connection with U.S. Appl. No. 14/495,706, filed Sep. 24, 2014, 8 pages.
Notice of Allowance mailed on Dec. 27, 2017, issued in connection with U.S. Appl. No. 14/495,659, filed Sep. 24, 2014, 6 pages.
Notice of Allowance mailed on Dec. 27, 2019, issued in connection with U.S. Appl. No. 14/495,633, filed Sep. 24, 2014, 7 pages.
Notice of Allowance mailed on Oct. 27, 2021, issued in connection with U.S. Appl. No. 15/664,634, filed Jul. 31, 2017, 7 pages.
Notice of Allowance mailed on Apr. 28, 2020, issued in connection with U.S. Appl. No. 15/612,126, filed Jun. 2, 2017, 5 pages.
Notice of Allowance mailed on Dec. 29, 2016, issued in connection with U.S. Appl. No. 14/197,403, filed Mar. 5, 2014, 5 pages.
Notice of Allowance mailed on Jul. 3, 2023, issued in connection with U.S. Appl. No. 17/006,972, filed Aug. 31, 2020, 6 pages.
Notice of Allowance mailed on Aug. 30, 2018, issued in connection with U.S. Appl. No. 14/821,513, filed Aug. 7, 2015, 10 pages.
Notice of Allowance mailed on Oct. 30, 2019, issued in connection with U.S. Appl. No. 16/458,453, filed Jul. 1, 2019, 7 pages.
Notice of Allowance mailed on May 31, 2017, issued in connection with U.S. Appl. No. 14/495,684, filed Sep. 24, 2014, 5 pages.
Notice of Allowance mailed on Feb. 4, 2021, issued in connection with U.S. Appl. No. 16/812,638, filed Mar. 9, 2020, 7 pages.
Notice of Allowance mailed on Feb. 4, 2022, issued in connection with U.S. Appl. No. 17/121,027, filed Dec. 14, 2020, 9 pages.
Notice of Allowance mailed on May 4, 2017, issued in connection with U.S. Appl. No. 14/495,595, filed Sep. 24, 2014, 5 pages.
Notice of Allowance mailed on May 4, 2022, issued in connection with U.S. Appl. No. 16/866,159, filed May 4, 2020, 8 pages.
Notice of Allowance mailed on Oct. 4, 2023, issued in connection with U.S. Appl. No. 17/536,408, filed Nov. 29, 2021, 7 pages.
Notice of Allowance mailed on Aug. 5, 2019, issued in connection with U.S. Appl. No. 15/612,126, filed Jun. 2, 2017, 5 pages.
Notice of Allowance mailed on Aug. 5, 2020, issued in connection with U.S. Appl. No. 16/188,186, filed Nov. 12, 2018, 11 pages.
Notice of Allowance mailed on May 5, 2021, issued in connection with U.S. Appl. No. 15/595,519, filed May 15, 2017, 7 pages.
Notice of Allowance mailed on Apr. 6, 2017, issued in connection with U.S. Appl. No. 14/197,403, filed Mar. 5, 2014, 5 pages.
Palm, Inc., "Handbook for the Palm VII Handheld," May 2000, 311 pages.
Park et al., "Group Synchronization in MultiCast Media Communications," Proceedings of the 5th Research on Multicast Technology Workshop, 2003, 5 pages.
Polycom Conference Composer User Guide, copyright 2001, 29 pages.
Pre-Brief Conference Decision mailed on Sep. 7, 2018, issued in connection with U.S. Appl. No. 14/297,193, filed Jun. 5, 2014, 2 pages.
Preinterview First Office Action mailed on May 4, 2016, issued in connection with U.S. Appl. No. 14/455,651, filed Aug. 8, 2014, 7 pages.
Preinterview First Office Action mailed on May 4, 2016, issued in connection with U.S. Appl. No. 14/495,659, filed Sep. 24, 2014, 6 pages.
Preinterview First Office Action mailed on May 5, 2016, issued in connection with U.S. Appl. No. 14/495,595, filed Sep. 24, 2014, 6 pages.
Preinterview First Office Action mailed on May 16, 2016, issued in connection with U.S. Appl. No. 14/495,633, filed Sep. 24, 2014, 6 pages.
Preinterview First Office Action mailed on Oct. 19, 2016, issued in connection with U.S. Appl. No. 14/821,513, filed Aug. 7, 2016, 5 pages.
Preinterview First Office Action mailed on May 23, 2016, issued in connection with U.S. Appl. No. 14/495,684, filed Sep. 24, 2014, 6 pages.
Presentations at WinHEC 2000, May 2000, 138 pages.
PRISMIQ, Inc., "PRISMIQ Media Player User Guide," 2003, 44 pages.
Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Non-Final Office Action mailed on Jan. 12, 2021, issued in connection with U.S. Appl. No. 16/952,217, filed Nov. 19, 2020, 8 pages.

(56) References Cited

OTHER PUBLICATIONS

Non-Final Office Action mailed on May 12, 2020, issued in connection with U.S. Appl. No. 16/516,767, filed Jul. 19, 2019, 12 pages.
Non-Final Office Action mailed on Mar. 13, 2020, issued in connection with U.S. Appl. No. 15/664,634, filed Jul. 31, 2017, 20 pages.
Non-Final Office Action mailed on Nov. 13, 2018, issued in connection with U.S. Appl. No. 16/143,301, filed Sep. 26, 2018, 27 pages.
Non-Final Office Action mailed on Sep. 13, 2023, issued in connection with U.S. Appl. No. 18/067,720, filed Dec. 18, 2022, 20 pages.
Non-Final Office Action mailed on Jan. 14, 2020, issued in connection with U.S. Appl. No. 15/966,337, filed Apr. 30, 2018, 16 pages.
Non-Final Office Action mailed on Jun. 14, 2017, issued in connection with U.S. Appl. No. 14/495,659, filed Sep. 24, 2014, 15 pages.
Non-Final Office Action mailed on Oct. 14, 2022, issued in connection with U.S. Appl. No. 17/101,549, filed Nov. 23, 2020, 18 pages.
Non-Final Office Action mailed on Feb. 16, 2021, issued in connection with U.S. Appl. No. 16/866,159, filed May 4, 2020, 10 pages.
Non-Final Office Action mailed on Jan. 16, 2019, issued in connection with U.S. Appl. No. 15/664,634, filed Jul. 31, 2017, 17 pages.
Non-Final Office Action mailed on Dec. 17, 2015, issued in connection with U.S. Appl. No. 14/173,253, filed Feb. 5, 2014, 18 pages.
Non-Final Office Action mailed on Jun. 17, 2016, issued in connection with U.S. Appl. No. 14/495,706, filed Sep. 24, 2014, 19 pages.
Non-Final Office Action mailed on May 18, 2016, issued in connection with U.S. Appl. No. 14/197,403, filed Mar. 5, 2014, 21 pages.
Non-Final Office Action mailed on Feb. 19, 2019, issued in connection with U.S. Appl. No. 15/966,337, filed Apr. 30, 2018, 14 pages.
Non-Final Office Action mailed on Mar. 19, 2019, issued in connection with U.S. Appl. No. 15/607,267, filed May 26, 2017, 18 pages.
Non-Final Office Action mailed on Sep. 20, 2021, issued in connection with U.S. Appl. No. 17/131,001, filed Dec. 22, 2020, 14 pages.
Non-Final Office Action mailed on Jun. 21, 2018, issued in connection with U.S. Appl. No. 15/692,090, filed Aug. 31, 2017, 20 pages.
Non-Final Office Action mailed on Jan. 22, 2019, issued in connection with U.S. Appl. No. 16/174,703, filed Oct. 30, 2018, 15 pages.
Non-Final Office Action mailed on Jul. 22, 2022, issued in connection with U.S. Appl. No. 17/536,408, filed Nov. 29, 2021, 9 pages.
Non-Final Office Action mailed on Jan. 23, 2024, issued in connection with U.S. Appl. No. 18/345,031, filed Jun. 30, 2023, 10 pages.
Non-Final Office Action mailed on Mar. 23, 2018, issued in connection with U.S. Appl. No. 15/227,074, filed Aug. 3, 2016, 11 pages.
Non-Final Office Action mailed on Apr. 24, 2024, issued in connection with U.S. Appl. No. 17/485,901, filed Sep. 27, 2021, 19 pages.
Non-Final Office Action mailed on Jan. 24, 2018, issued in connection with U.S. Appl. No. 15/607,267, filed May 26, 2017, 17 pages.
Non-Final Office Action mailed on Sep. 24, 2021, issued in connection with U.S. Appl. No. 17/121,027, filed Dec. 14, 2020, 11 pages.
Non-Final Office Action mailed on Dec. 27, 2018, issued in connection with U.S. Appl. No. 14/297,193, filed Jun. 5, 2014, 37 pages.
Non-Final Office Action mailed on Jul. 27, 2023, issued in connection with U.S. Appl. No. 17/838,827, filed Jun. 13, 2022, 16 pages.
Non-Final Office Action mailed on Oct. 27, 2021, issued in connection with U.S. Appl. No. 16/866,159, filed May 4, 2020, 14 pages.
Non-Final Office Action mailed on Apr. 28, 2020, issued in connection with U.S. Appl. No. 14/297,193, filed Jun. 5, 2014, 34 pages.
Non-Final Office Action mailed on Nov. 28, 2017, issued in connection with U.S. Appl. No. 14/821,513, filed Aug. 7, 2015, 17 pages.
Non-Final Office Action mailed on Sep. 28, 2023, issued in connection with U.S. Appl. No. 17/534,217, filed Nov. 23, 2021, 29 pages.
Non-Final Office Action mailed on Sep. 30, 2020, issued in connection with U.S. Appl. No. 15/595,519, filed May 15, 2017, 18 pages.
Non-Final Office Action mailed on Aug. 31, 2023, issued in connection with U.S. Appl. No. 17/822,851, filed Aug. 29, 2022, 21 pages.
Non-Final Office Action mailed on Jul. 31, 2019, issued in connection with U.S. Appl. No. 15/595,519, filed May 15, 2017, 14 pages.
Non-Final Office Action mailed on Apr. 4, 2019, issued in connection with U.S. Appl. No. 15/612,126, filed Jun. 2, 2017, 9 pages.
Non-Final Office Action mailed on Aug. 4, 2020, issued in connection with U.S. Appl. No. 16/812,638, filed Mar. 9, 2020, 13 pages.
Non-Final Office Action mailed on Dec. 6, 2018, issued in connection with U.S. Appl. No. 14/495,633, filed Sep. 24, 2014, 15 pages.
Non-Final Office Action mailed on Jan. 6, 2023, issued in connection with U.S. Appl. No. 17/822,851, filed Aug. 29, 2022, 18 pages.
Non-Final Office Action mailed on Jun. 6, 2023, issued in connection with U.S. Appl. No. 17/930,917, filed Sep. 9, 2022, 31 pages.
Non-Final Office Action mailed on May 7, 2021, issued in connection with U.S. Appl. No. 15/664,634, filed Jul. 31, 2017, 22 pages.
Non-Final Office Action mailed on Sep. 7, 2022, issued in connection with U.S. Appl. No. 17/006,972, filed Aug. 31, 2020, 14 pages.
North American MPEG-2 Information, "The MPEG-2 Transport Stream," Retrieved from the Internet: URL: http://www.coolstf.com/mpeg/#ts, 2006, pp. 1-5.
Notice of Allowance mailed Jul. 9, 2021, issued in connection with U.S. Appl. No. 16/952,217, filed Nov. 19, 2020, 8 pages.
Notice of Allowance mailed on May 4, 2016, issued in connection with U.S. Appl. No. 13/748,357, filed Jan. 23, 2013, 11 pages.
Notice of Allowance mailed on Nov. 4, 2022, issued in connection with U.S. Appl. No. 17/569,008, filed Jan. 5, 2022, 8 pages.
Notice of Allowance mailed on Apr. 5, 2023, issued in connection with U.S. Appl. No. 17/528,808, filed Nov. 17, 2021, 11 pages.
Notice of Allowance mailed on Dec. 1, 2023, issued in connection with U.S. Appl. No. 17/838,827, filed Jun. 13, 2022, 10 pages.
Notice of Allowance mailed on Oct. 1, 2021, issued in connection with U.S. Appl. No. 16/846,620, filed Apr. 13, 2020, 11 pages.
Notice of Allowance mailed on Apr. 10, 2020, issued in connection with U.S. Appl. No. 16/188,186, filed Nov. 12, 2018, 10 pages.
Notice of Allowance mailed on Feb. 11, 2019, issued in connection with U.S. Appl. No. 15/692,090, filed Aug. 31, 2017, 8 pages.
Advisory Action mailed on Feb. 1, 2017, issued in connection with U.S. Appl. No. 14/297,193, filed Jun. 5, 2014, 6 pages.
Advisory Action mailed on Feb. 3, 2017, issued in connection with U.S. Appl. No. 14/495,659, filed Sep. 24, 2014, 5 pages.
Advisory Action mailed on Sep. 11, 2019, issued in connection with U.S. Appl. No. 14/495,633, filed Sep. 24, 2014, 3 pages.
Advisory Action mailed on Jul. 12, 2016, issued in connection with U.S. Appl. No. 14/173,253, filed Feb. 5, 2014, 5 pages.
Advisory Action mailed on Mar. 19, 2019, issued in connection with U.S. Appl. No. 15/595,519, filed May 15, 2017, 3 pages.
Advisory Action mailed on Oct. 21, 2019, issued in connection with U.S. Appl. No. 15/664,634, filed Jul. 31, 2017, 4 pages.
Advisory Action mailed on Apr. 22, 2024, issued in connection with U.S. Appl. No. 18/067,720, filed Dec. 18, 2022, 5 pages.

(56) References Cited

OTHER PUBLICATIONS

Advisory Action mailed on Aug. 22, 2017, issued in connection with U.S. Appl. No. 14/173,253, filed Feb. 5, 2014, 4 pages.
Advisory Action mailed on Mar. 22, 2024, issued in connection with U.S. Appl. No. 17/101,549, filed Nov. 23, 2020, 5 pages.
Advisory Action mailed on Nov. 25, 2019, issued in connection with U.S. Appl. No. 15/607,267, filed May 26, 2017, 5 pages.
Advisory Action mailed on Oct. 25, 2019, issued in connection with U.S. Appl. No. 15/966,337, filed Apr. 30, 2018, 4 pages.
Advisory Action mailed on Dec. 27, 2022, issued in connection with U.S. Appl. No. 17/536,408, filed Nov. 29, 2021, 5 pages.
Advisory Action mailed on May 29, 2020, issued in connection with U.S. Appl. No. 15/595,519, filed May 15, 2017, 2 pages.
Advisory Action mailed on Mar. 8, 2021, issued in connection with U.S. Appl. No. 14/297,193, filed Jun. 5, 2014, 3 pages.
Advisory Action mailed on Mar. 8, 2024, issued in connection with U.S. Appl. No. 17/485,901, filed Sep. 27, 2021, 4 pages.
Akyildiz et al., "Multimedia Group Synchronization Protocols for Integrated Services Networks," IEEE Journal on Selected Areas in Communications, 1996 pp. 162-173, vol. 14, No. 1.
Anonymous: "Email Parser Tool—customizable email parsing software by ITG," May 17, 2014, [online] Retrieved from the Internet on Nov. 5, 2019: (URL:https//web.archive.org/web/20140517050139:// emailparser.net/).
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
BENSLIMANE Abderrahim, "A Multimedia Synchronization Protocol for Multicast Groups," Proceedings of the 26th Euromicro Conference, 2000, pp. 456-463, vol. 1.
Biersack et al., "Intra- and Inter-Stream Synchronization for Stored Multimedia Streams," IEEE International Conference on Multimedia Computing and Systems, 1996, pp. 372-381.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Bretl W.E., et al., MPEG2 Tutorial [online], 2000 [retrieved on Jan. 13, 2009] Retrieved from the Internet:( http://www.bretl.com/ mpeghtml/MPEGindex.htm), pp. 1-23.
Chinese Patent Office, First Office Action and Translation mailed on Feb. 2, 2019, issued in connection with Chinese Application No. 201580011640.5, 12 pages.
Chinese Patent Office, First Office Action and Translation mailed on Aug. 26, 2020, issued in connection with Chinese Application No. 201910608857.4, 17 pages.
Chinese Patent Office, First Office Action mailed on Feb. 27, 2019, issued in connection with Chinese Application No. 201580007534.X, 9 pages.
Chinese Patent Office, First Office Action mailed on Sep. 4, 2017, issued in connection with Chinese Application No. 2014800172148.0, 16 pages.
Chinese Patent Office, Second Office Action mailed on Apr. 11, 2018, issued in connection with Chinese Application No. 201480017214.8, 7 pages.
Chinese Patent Office, Third Office Action mailed on Oct. 18, 2018, issued in connection with Chinese Application No. 2014800172148, 8 pages.
Corrected Notice of Allowability mailed on Jan. 19, 2017, issued in connection with U.S. Appl. No. 14/197,403, filed Mar. 5, 2014, 2 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Decision to Refuse EP Application mailed on Oct. 16, 2018, issued in connection with European Application No. 157758970, 48 pages.
European Patent Office, Decision to Refuse EP Application mailed on Sep. 27, 2018, issued in connection with European Application No. 15781794.1, 54 pages.
European Patent Office, Decision to Refuse mailed on Aug. 2, 2021, issued in connection with European Application No. 15829058.5, 13 pages.
European Patent Office, EP Supplemental Search mailed Dec. 19, 2017, issued in connection with EP Application No. 15829058.5, 12 pages.
European Patent Office, European Extended Search Report mailed on Feb. 5, 2018, issued in connection with EP Application No. 15803430.6, 8 pages.
European Patent Office, European Office Action mailed on Nov. 13, 2019, issued in connection with European Application No. 15829058.5, 8 pages.
European Patent Office, European Office Action mailed on Jan. 2, 2019, issued in connection with European Application No. 15829058.5, 4 pages.
European Patent Office, European Office Action mailed on Aug. 3, 2017, issued in connection with EP Application No. 15781794.1, 6 pages.
European Patent Office, European Supplemental Search Report mailed on Sep. 18, 2017, issued in connection with EP Application No. 15829058.5, 13 pages.
European Patent Office, European Supplemental Search Report mailed on Jan. 27, 2016, issued in connection with European Application No. 14743335.3, 8 pages.
European Patent Office, Examination Report mailed on Feb. 3, 2017, issued in connection with European Patent Application No. 14743335.3, 5 pages.
European Patent Office, Extended European Search Report mailed on Mar. 15, 2017, issued in connection with European Application No. 15758460.8, 9 pages.
European Patent Office, Extended European Search Report mailed on Dec. 23, 2016, issued in connection with European Application No. 15746781.2, 10 pages.
European Patent Office, Notice of Appeal European Patent Application mailed on Mar. 16, 2023, issued in connection with European Application No. 15781794.1, 13 pages.
European Patent Office, Office Action mailed on Mar. 2, 2017, issued in connection with European Application No. 15775566.1, 7 pages.

\* cited by examiner

WEBPAGE MEDIA PLAYBACK

CROSS REFERENCE TO RELATED APPLICATIONS

This application is a continuation of U.S. patent application Ser. No. 17/006,972, filed on Aug. 31, 2020, issued as U.S. Pat. No. 11,782,977 on Oct. 10, 2023, which is a continuation of U.S. patent application Ser. No. 15/612,126, filed on Jun. 2, 2017, issued as U.S. Pat. No. 10,762,129 on Sep. 1, 2020, which is a continuation of U.S. patent application Ser. No. 14/197,403, filed on Mar. 5, 2014, issued as U.S. Pat. No. 9,679,054 on Jun. 13, 2017, each of which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
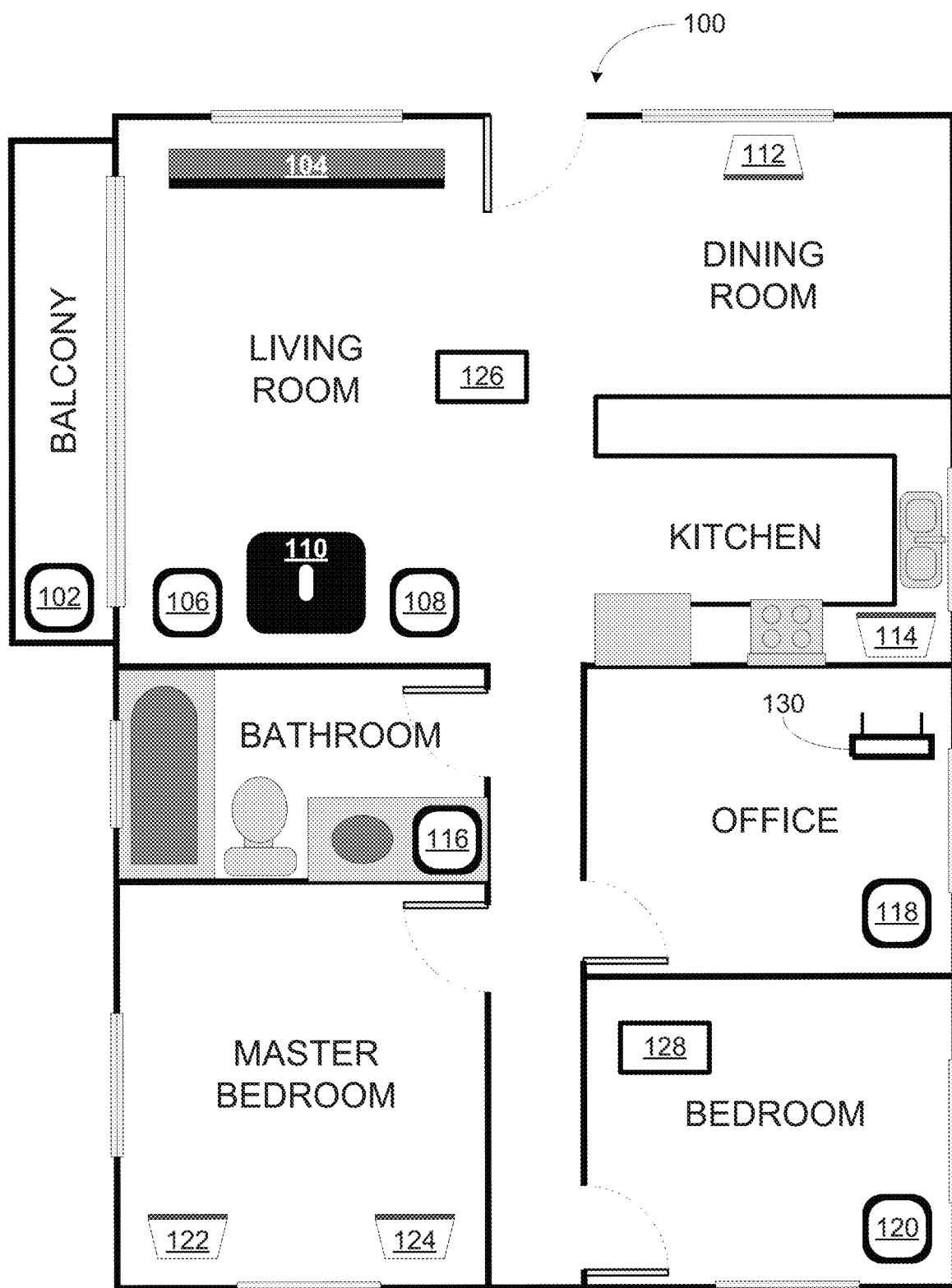
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve the playback of media items from a webpage by a playback zone of a media playback system. In one embodiment, playback zones in a media playback system are identified when a web-browsing interface is launched. When a webpage is displayed on the web-browsing interface, one or more links to playable media items on the webpage are identified, and the webpage is modified such that one or more representations corresponding to the one or more links are selectable to cause the respective playback media items to be played by one or more of the identified playback zones.

In one example, a selection of a representation will prompt a display of the identified playback zones from which the user can choose a playback zone to play the corresponding media item. In another example, the media item may be added to a playback queue associated with the selected playback zone in addition to, or instead of being immediately played by the selected playback zone.

As indicated above, the present application involves facilitating playback of media items on a webpage by a playback zone of a media playback system. In one aspect, a method is provided. The method involves identifying one or more playback zones of a media playback system upon opening a web-browsing interface, identifying on a webpage, a link to a playable media item, and modifying the webpage such that a representation associated with the link is selectable to cause the media item to be played in the one or more playback zones.

In another aspect, a device is provided. The device includes a processor, and memory having stored thereon instructions executable by the processor to cause the device to perform functions. The functions include identifying one or more playback zones of a media playback system upon opening a web-browsing interface, identifying on a webpage, a link to a playable media item, and modifying the webpage such that a representation associated with the link is selectable to cause the media item to be played in the one or more playback zones.

In yet another aspect, a non-transitory computer readable memory is provided. The non-transitory computer readable memory has stored thereon instructions executable by a computing device to cause the computing device to perform functions. The functions include identifying one or more playback zones of a media playback system upon opening a web-browsing interface, identifying on a webpage, a link to a playable media item, and modifying the webpage such that a representation associated with the link is selectable to cause the media item to be played in the one or more playback zones.

The present application further involves playing media items on a webpage in a playback zone of a media playback system. In one aspect, a method is provided. The method involves displaying on a web-browsing interface, a representation associated with a link to a media item, and responsive to a first input indicating a selection of the representation, displaying a list of one or more playback zones in a media playback system. The one or more playback zones are identified upon, or subsequent to a launching of the web-browsing interface. The method also involves causing the particular playback zone to play the media item responsive to a second input indicating a selection of a particular playback zone in the list of one or more playback zones.

In another aspect, a device is provided. The device includes a processor, and memory having stored thereon instructions executable by the processor to cause the device to perform functions. The functions include displaying on a web-browsing interface, a representation associated with a link to a media item, and responsive to a first input indicating a selection of the representation, displaying a list of one or more playback zones in a media playback system. The one or more playback zones are identified upon, or subsequent to a launching of the web-browsing interface. The functions also include causing the particular playback zone to play the media item responsive to a second input indicating a selection of a particular playback zone in the list of one or more playback zones.

In yet another aspect, a non-transitory computer readable memory is provided. The non-transitory computer readable memory has stored thereon instructions executable by a computing device to cause the computing device to perform functions. The functions include displaying on a web-browsing interface, a representation associated with a link to a media item, and responsive to a first input indicating a selection of the representation, displaying a list of one or more playback zones in a media playback system. The one or more playback zones are identified upon, or subsequent to a launching of the web-browsing interface. The functions also include causing the particular playback zone to play the media item responsive to a second input indicating a selection of a particular playback zone in the list of one or more playback zones.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
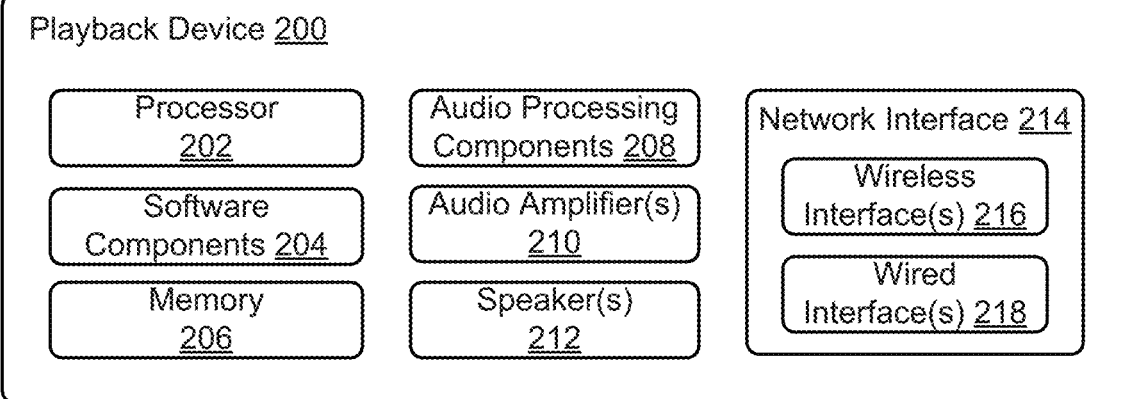
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
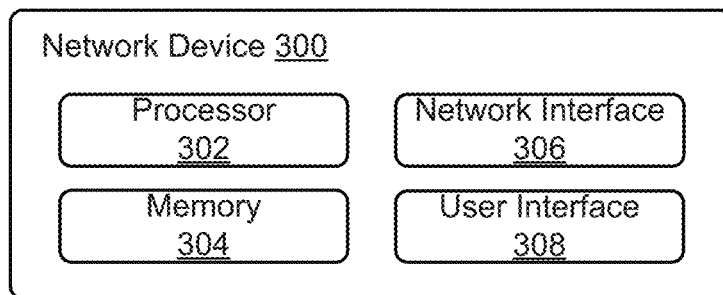
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
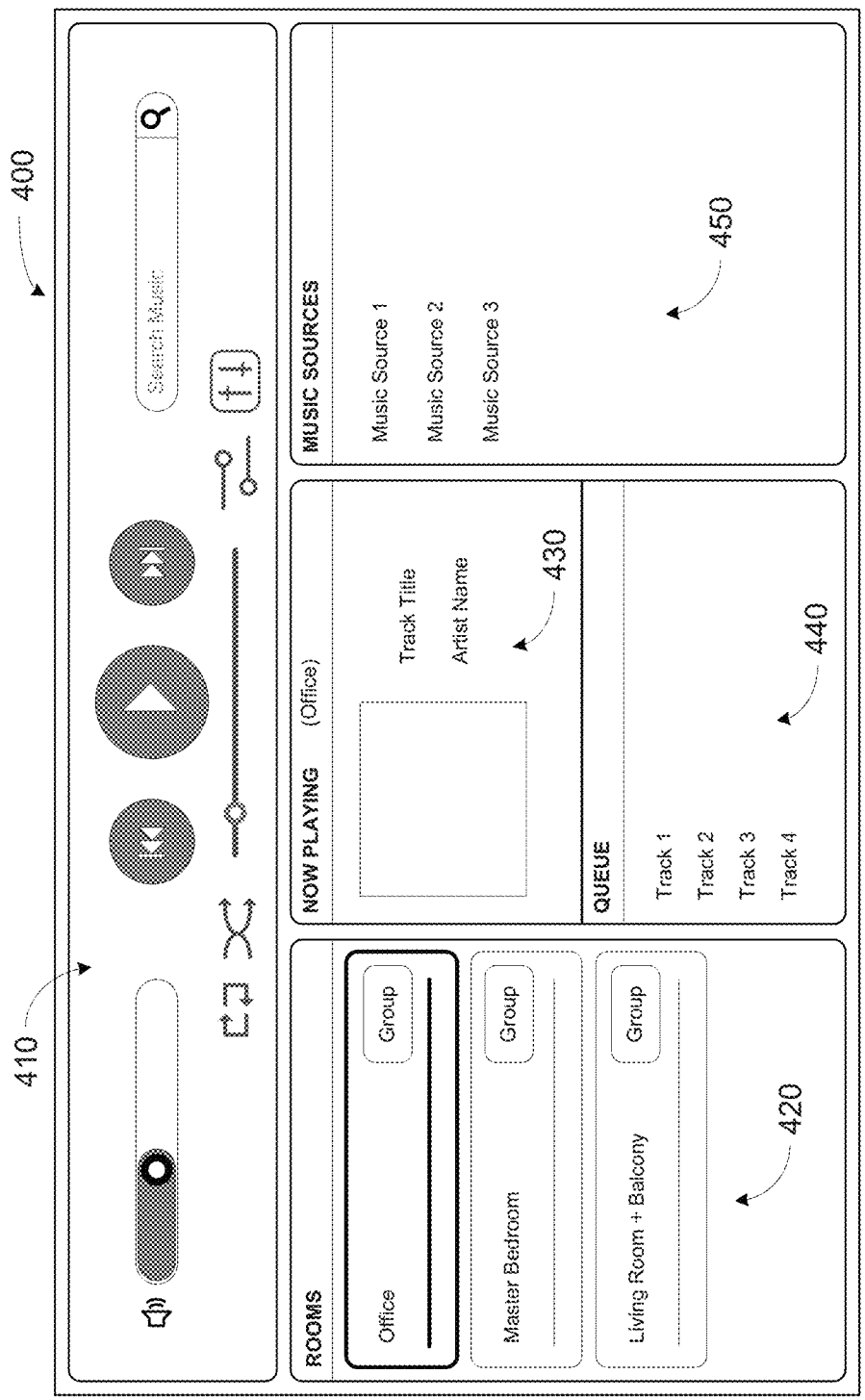
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Figure 5:
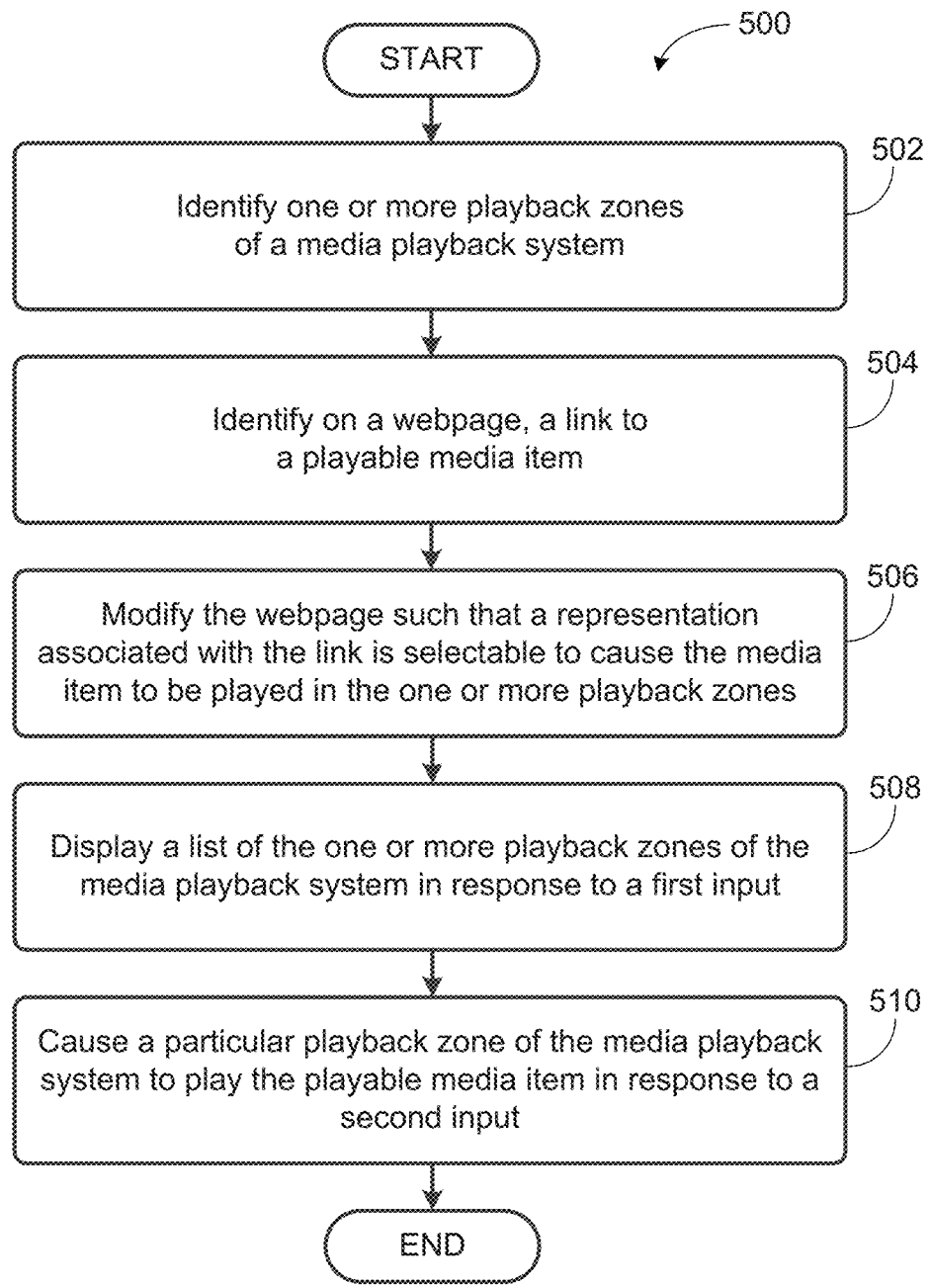
FIG. 5 shows an example flow diagram for facilitating playback of media items on a webpage by a playback zone of a media playback system.

III. Example Methods for Playback of Media Items on a Webpage by a Playback Zone As discussed above, embodiments described herein involve playback of media items from a webpage by a playback zone of a media playback system. Method 500 shown in FIG. 5 presents an embodiment of a method for facilitating such a playback of media items. The method 500 may can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-510. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of a possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, the method 500 involves identifying one or more playback zones of a media playback system. In one example, the identification of the one or more playback zones may be performed upon opening or launching a web-browsing interface on a device, such as a computer or mobile device. As described above in section II, each playback zone in the media playback system may include one or more playback devices. In other example, the identification of the one or more playback zones may be performed at some time subsequent to launching the web-browsing interface. For instance, identification may occur upon selecting a media item link, or upon loading a webpage by the web-browsing interface.

In one example, each of the playback devices in the media playback system may be connected to a local area network (LAN) according to a Universal Plug and Play (UPnP) network protocol. As such, each of the playback devices in the media playback system may be discovered by other devices, including the device providing the web-browsing interface, that are also connected to the LAN according to the UPnP network protocol. The one or more playback zones in the media playback system may be identified based on the identified playback devices.

In some cases, other UPnP capable devices, such as printers, NAS devices, and televisions, among others, that are not part of the media playback system may also be discovered according to the UPnP protocol. In such cases, the process of identifying playback zones in the media playback system may further involve filtering out devices that are not part of the media playback system. For instance, devices in the media playback system may each have a device name (or device identification) that is based on a particular naming convention, and discernable from names of devices that are not part of the media playback system. As such, filtering out devices that are not part of the media playback system may involve a search for devices having device names fitting the particular naming convention of devices in the media playback system.

In another example, identification of the one or more playback zones may involve a user account of the user. For instance, the media playback system may be associated with an email address that the user provided when registering the media playback system. As such, if a user logs into the email account or otherwise provides the email address to the web-browsing interface, the media playback system associated with the email address may be identified, and accordingly, playback zones of the media playback system may also be identified. In this embodiment, the device providing the web-browsing interface may not need to be on the same network as the media playback system in order to identify the playback zones in the media playback system. Rather, the web-browsing interface device may need to have access via a wide area network (WAN) for example, to a server where account information associated with the media playback system is stored. In another case, if a controller software application for the media playback system is installed and/or launched on the device providing the web-browsing interface, identifying the playback zones of the media playback system may involve retrieving playback zone information from the controller software application.

In yet another example, identification of the one or more playback zones may involve retrieving previously stored data indicating the one or more playback zones in the media playback system. In one case, during a previous launching of the web-browsing interface, the playback zones of the media playback system were identified as described above, and data indicating the identified playback zones was stored. In one instance, the data indicating the identified playback zones may be stored in a cloud server. In another instance, the data may be stored locally on the web-browsing interface device. In a further instance, the data stored locally on the web-browsing interface device may be stored in association with the controller software application for the media playback system, as discussed above. In another case, a discovery of the playback zones, such as described above, may be performed periodically, and data indicating the identified playback zones may be stored and/or updated. In these cases, the stored data may be retrieved when the web-browsing interface is launched again. Other examples, including variations and combinations of those described above are also possible.

At block 504 in FIG. 5, the method 500 involves identifying on a webpage, a link to a playable media item. In one example, the user may access a webpage by sending a request according to a Hypertext Transfer Protocol (HTTP) by entering a URL into the web-browsing interface. In response to the request, the web-browsing interface may receive a Hypertext Markup Language (HTML) file indicating the webpage.

Identifying a link to a playable media item on the webpage may involve searching the received HTML file for references to playable media items. For instance, if the playback devices of the media playback system are capable of playing files with file extensions .wav, .m4a, and .mp3, then a search may be performed in the received HTML file for references to files having file extensions .wav, .m4a, or .mp3. One having ordinary skill in the art will understand that .wav, .m4a, and .mp3 are only example file extensions, and will appreciate that other file formats for audio and/or visual files may also be playable by devices in the media playback system and accordingly searched for when identifying links to playable media items on the webpage.

When the web-browsing interface displays the website, the link to the media item may be provided in the form of a selectable graphical or textual link representation, among others. In discussions herein, a selection of the link representation or any representation associated with a link may involve one or more mouse-clicks, finger taps or other user interactions on the representation. Other examples are also possible.

In one case, a selection of the link representation may cause media playback software to be launched to play the media item. In another case, a selection of the link representation may cause the web-browsing interface to prompt the user to indicate what the user wishes to do with the media item. For instance, a list of options may be provided for the user to select, including saving the media item, playing the media item with a particular certain media playback software, and opening the media item within the web-browsing interface using some web-browsing interface plug-in application, among other examples.

At block 506, the method involves modifying the webpage such that a representation associated with the link is selectable to cause the media item to be played in the one or more playback zones. Modifying the webpage may involve modifying the received HTML file. In one example, the webpage may be modified before the web-browsing interface displays the webpage. In other words, the web-browsing interface displays only the modified webpage and not the originally received webpage. In another example, the originally received webpage may be initially displayed by the web-browsing interface until modification of the webpage is complete, at which point the web-browsing interface may be updated with the modified webpage. Other examples are also possible.

In some embodiments, causing the media item to be played in the one or more playback zones may involve adding the media content to a playback queue associated with the one or more playback zones. For instance, the media item may be added to the playback queue prior to playback of the media item. As such, in discussions herein, a selection of the representation to cause the media item to be played in the one or more playback zones may cause the media item to be played immediately, cause the media item to be added to the playback queue, or both.

Figure 6A:
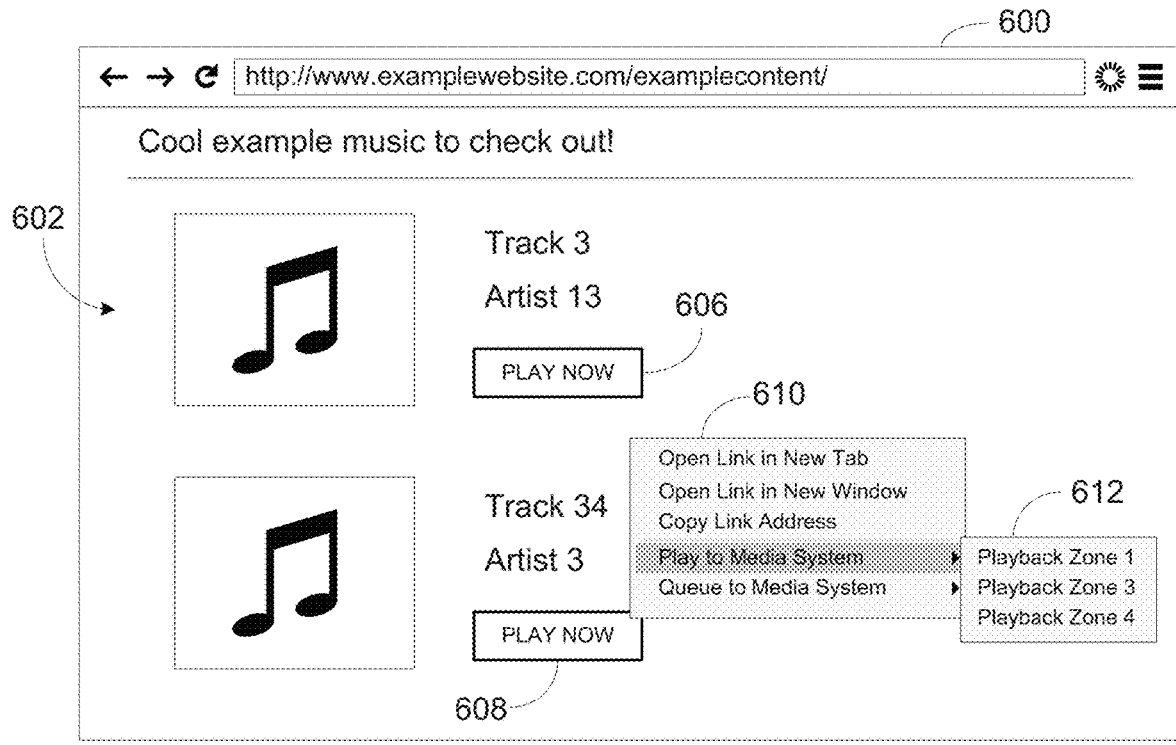
FIGS. 6A, 6B, 6C, and 6D show example webpage representations with playable media items.

FIGS. 6A-6D shows example modified webpages 600 and 650 with representations associated with links to media items that are selectable to cause the media items to be played in one or more identified playback zones. As shown in FIG. 6A, webpage 600 includes content 602. The content 602 may include representations 606 and 608 that are selectable to cause media items corresponding to the respective representations 606 and 608 to be played in the one or more playback zones. In this example, the respective representations 606 and 608 may be in form of buttons. The representations 606 and 608 may not be visually different from link representations to the media items on the originally received webpage.

As shown, a selection of the representation 608 may cause the web-browsing interface to prompt the user to indicate what the user wishes to do with the media item by providing a list of executable options 610. The options 610 in this example may include "Open Link in New Tab," "Open Link in New Window," and "Copy Link Address" that may have also been available when selecting link representations on the originally received webpage. In this case, however, the options 610 also include "Play to Media System" and "Queue to Media System" which were not available when selecting link representations on the originally received webpage. As previously indicated, selecting "Play to Media System" may cause the media item corresponding to representation 608 to be played by the one or more playback zones in the media playback system, while selecting "Queue to Media System" may cause the media item corresponding to representation 608 to be added to a playback queue associated with the one or more playback zones in the media playback system. Other options that are not shown or discussed may also be in the executable options 610. Further, one having ordinary skill in the art will appreciate that while the displayed position of the options 610 appears to be proximal to the selected representation, display of the options 610 may alternatively be displayed anywhere on the web-browsing interface.

Figure 6B:
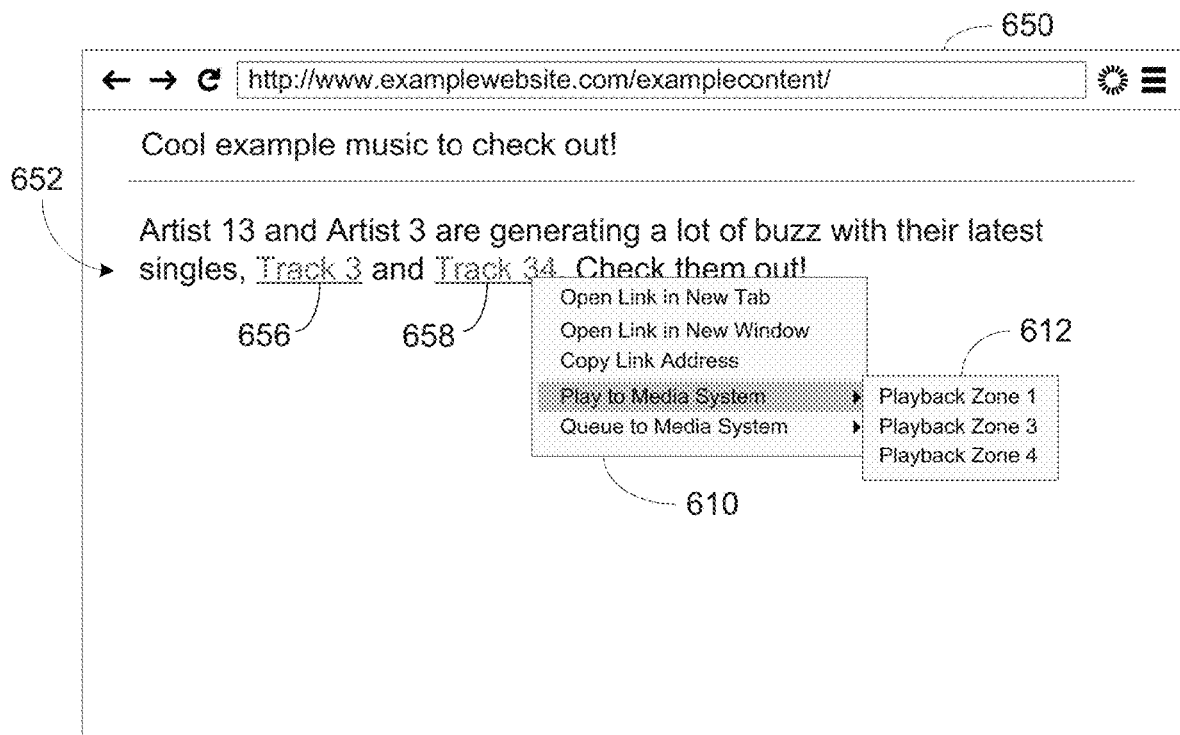

FIG. 6B shows a webpage 650 that includes textual content 652. For illustration purposes, in this example, the textual content 652 includes imbedded textual representations 656 and 658 as opposed to the button type graphical representations 606 and 608 of FIG. 6A. Nevertheless, the textual representations 656 and 658 are also selectable to cause media items corresponding to the respective textual representations 656 and 658 to be played in the one or more playback zones. Further, the representations 656 and 658 may also not be visually different from link representations to the media items on the originally received webpage, and a selection of the textual representation 656 or 658, as shown, may also cause the web-browsing interface to prompt the user to indicate what the user wishes to do with the corresponding media item by providing the list of executable options 610.

Figure 6C:
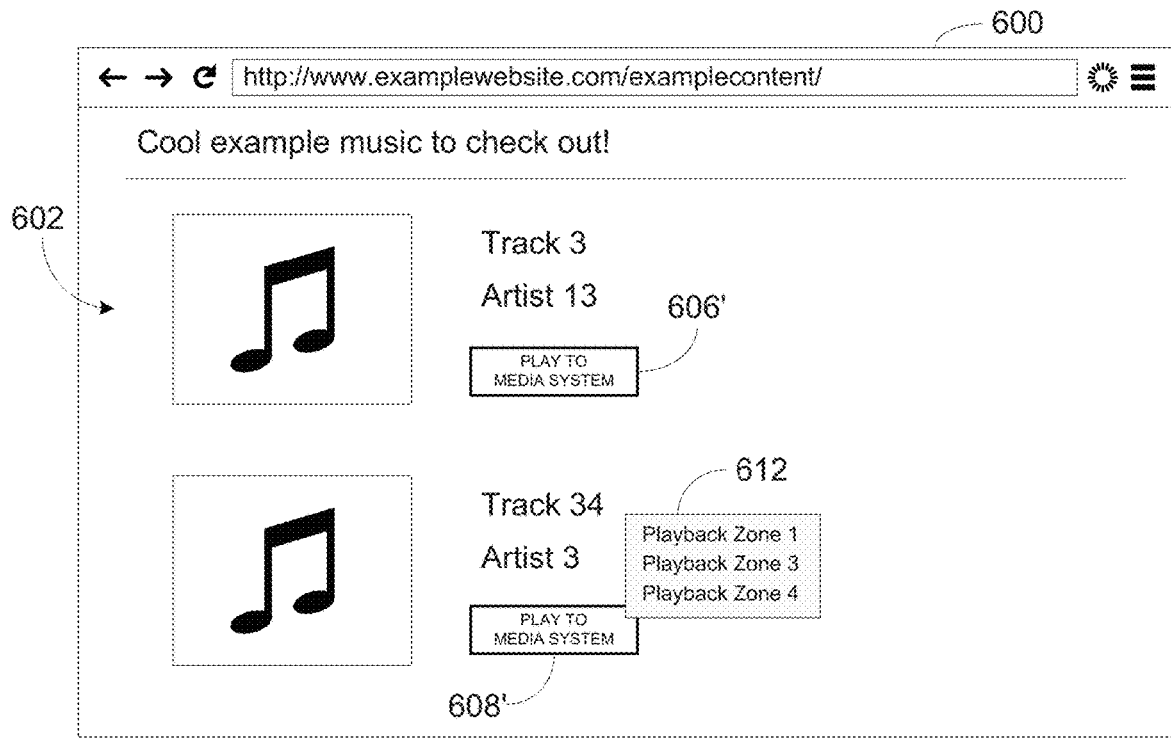

In another example, the representation associated with the link may replace the link representation on the originally received webpage to indicate that the media item can be played in the one or more playback zones. FIG. 6C shows the webpage 600 with content 602 similar to that shown in FIG. 6A. In this example, however, the representations 606' and 608' are visually different from the representations 606 and 608 of FIG. 6A, and accordingly different from the link representations to the media items on the originally received webpage. In other words, in this example, the representations 606' and 608' replace the link representations on the originally received webpage. As shown, the representations 606' and 608' may be in the form of buttons with text "Play to Media System" (instead of "Play Now," as was the case with representations 606 and 608 and/or the link representations on the originally received webpage) to imply that a selection of the representations may cause the corresponding media items to be played by one or more playback zones in the media playback system.

Figure 6D:
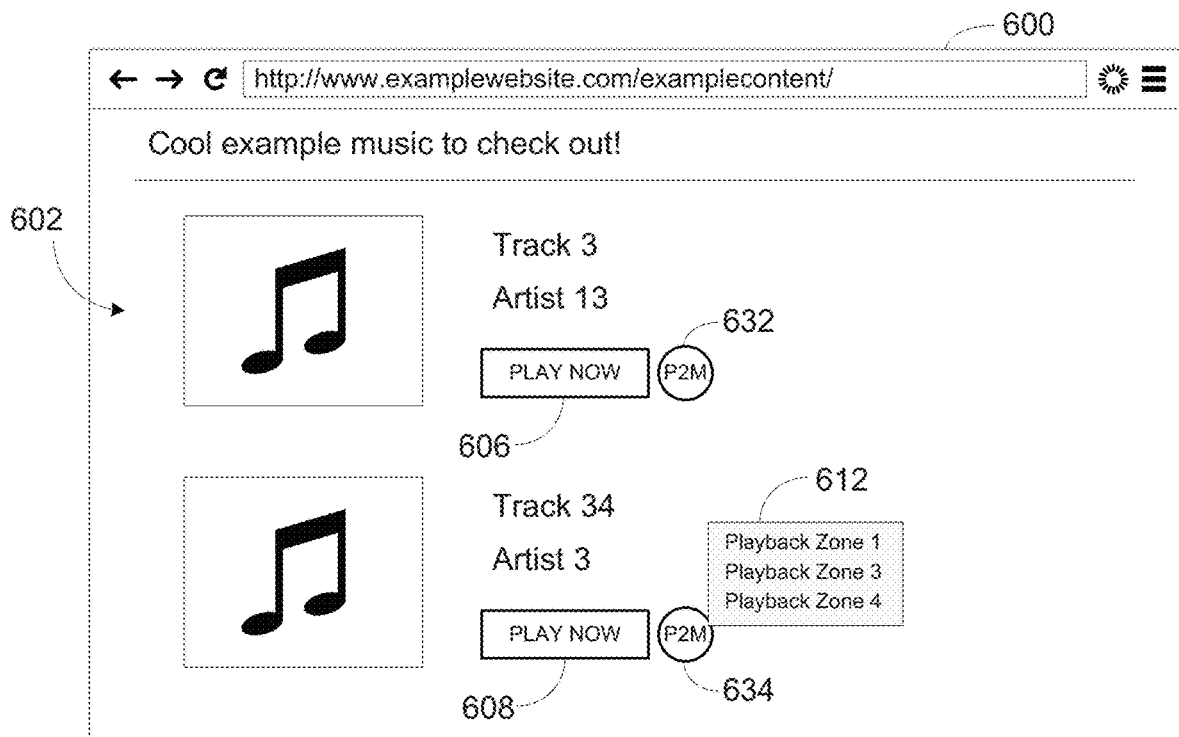

In yet another example, the representation associated with the link may be in the form of a representative icon proximal to the link representation on the originally received webpage indicating the option to cause the media item to be played in the one or more playback zones. FIG. 6D shows the webpage 600 with content 602 similar to that shown in FIGS. 6A and 6C. In this example, however, representation 606 and 608 may still be displayed on the website 600, and the content 602 may further include representative icons 632 and 634. In this example, icon 632 may be associated with representation 606 and icon 634 may be associated with representation 608. In one case, the icon 632 and icon 634 may be merely informative, indicating that selections of the representation 606 and representation 608, respectively, may cause media items corresponding to the respective representations 606 and 608 to be played in the one or more playback zones. In another case, selections of the representations 606 and 608 may cause actions (such as launching media playback software to play the corresponding media items) similar to that if the same associated link representations were selected in the originally receive webpage. However, in this case, the icons 632 and 634 may be selectable to cause the corresponding media items to be played in the one or more playback zones of the media playback system. Other examples that are not shown or discussed are also possible.

Referring back to method 500 in FIG. 5, block 508 involves displaying a list of the one or more playback zones of the media playback system in response to a first input. The one or more playback zones of the media playback system are the one or more playback zones identified at block 502. In the examples shown in FIGS. 6A and 6B, the first input may be a selection of "Play to Media System" or "Queue to Media System" in the options 610. In the example shown in FIG. 6C, the first input may be a selection of the representation 606' or 608', and in the example shown in FIG. 6D, the first input may be a selection of the representative icons 632 or 634. In each of the above examples, a playback zones list 612 may be displayed in response to the first input.

As shown, the playback zones list 612 may include "Playback Zone 1," "Playback Zone 3," and "Playback Zone 4." In one example, the playback zones in the list 612 may be ordered according to alphabetical order of the zone names. In another example, the playback zones in the list 612 may be ordered chronologically according to when each playback zone was created or when each playback zone most recently played media content. In yet another example, the playback zones in the list 612 may be ordered according to physical proximities between the computing device providing the web-browsing interface and the respective one or more playback zones. For instance, if a user is using the web-browsing interface on a tablet or personal computer in "Playback Zone 3", then "Playback Zone 3" may be listed first. In a further example, if the one or more playback zones were identified based on information retrieved from the controller software application for the media playback system, a playback zone that is currently being accessed via the controller software application running on the web-browsing interface device may be listed first. Other examples are also possible.

In addition, the playback zones in the list 612 may be listed or ordered according to playback states of the playback zones. For instance, playback zones that are not currently playing any media content may be listed first. Along the same lines, an icon or some other graphical effect may be provided in the playback zones list 612 to indicate that certain playback zones are currently playing media content, and other playback zones are not. In some cases, playback zones that are currently playing media content may not be available to play media items from the webpage 600 or 650. In one case, the unavailable playback zone may be grayed out and/or non-selectable. In another case, the unavailable playback zone may not be included in the list 612 at all. In addition to those described and/or suggested above, other selectable representations may be provided while maintaining the same or similar functionalities of playing the corresponding media item or prompting for additional input from the user are also possible.

At block 510 in FIG. 5, the method 550 involves causing a particular playback zone of the media playback system to play the playable media item in response to a second input. In one example, the second input may involve a selection of the particular playback zone from the list of the one or more playback zones. Upon the selection of the particular playback zone, the link to the media item corresponding to the representation selected as part of the first input at block 506 may be sent to the media playback system to be played in the particular playback zone. In one example, the link may be sent to a playback device in the particular playback zone.

As indicated above, the media item may be added to a playback queue associated with the particular playback zone, in addition to, or instead of causing the playback zone to play the media item immediately. In particular, if "Queue to Media System" in options 610 was selected in the examples shown in FIGS. 6A and 6B, the media item is first added to the associated playback queue before the media item may be subsequently played by the particular playback zone. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves facilitating playback of media items on a webpage by a playback zone of a media playback system. In one aspect, a method is provided. The method involves identifying one or more playback zones of a media playback system upon opening a web-browsing interface, identifying on a webpage, a link to a playable media item, and modifying the webpage such that a representation associated with the link is selectable to cause the media item to be played in the one or more playback zones.

In another aspect, a device is provided. The device includes a processor, and memory having stored thereon instructions executable by the processor to cause the device to perform functions. The functions include identifying one or more playback zones of a media playback system upon opening a web-browsing interface, identifying on a webpage, a link to a playable media item, and modifying the webpage such that a representation associated with the link is selectable to cause the media item to be played in the one or more playback zones.

In yet another aspect, a non-transitory computer readable memory is provided. The non-transitory computer readable memory has stored thereon instructions executable by a computing device to cause the computing device to perform functions. The functions include identifying one or more playback zones of a media playback system upon opening a web-browsing interface, identifying on a webpage, a link to a playable media item, and modifying the webpage such that a representation associated with the link is selectable to cause the media item to be played in the one or more playback zones.

The present application further involves playing media items on a webpage in a playback zone of a media playback system. In one aspect, a method is provided. The method involves displaying on a web-browsing interface, a representation associated with a link to a media item, and responsive to a first input indicating a selection of the representation, displaying a list of one or more playback zones in a media playback system. The one or more playback zones are identified upon, or subsequent to a launching of the web-browsing interface. The method also involves causing the particular playback zone to play the media item responsive to a second input indicating a selection of a particular playback zone in the list of one or more playback zones.

In another aspect, a device is provided. The device includes a processor, and memory having stored thereon instructions executable by the processor to cause the device to perform functions. The functions include displaying on a web-browsing interface, a representation associated with a link to a media item, and responsive to a first input indicating a selection of the representation, displaying a list of one or more playback zones in a media playback system. The one or more playback zones are identified upon, or subsequent to a launching of the web-browsing interface. The functions also include causing the particular playback zone to play the media item responsive to a second input indicating a selection of a particular playback zone in the list of one or more playback zones.

In yet another aspect, a non-transitory computer readable memory is provided. The non-transitory computer readable memory has stored thereon instructions executable by a computing device to cause the computing device to perform functions. The functions include displaying on a web-browsing interface, a representation associated with a link to a media item, and responsive to a first input indicating a selection of the representation, displaying a list of one or more playback zones in a media playback system. The one or more playback zones are identified upon, or subsequent to a launching of the web-browsing interface. The functions also include causing the particular playback zone to play the media item responsive to a second input indicating a selection of a particular playback zone in the list of one or more playback zones.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising:
a network interface;
at least one processor; and
at least one non-transitory computer-readable medium comprising program instructions that are executable by the at least one processor such that the system is configured to:
cause, via a wide area network, a web browser on a user device to display a webpage comprising graphical representations of media items of a streaming audio service;
receive, via the web browser, first input data representing selection of at least one first media item from among the media items graphically represented on the webpage;
according to the received first input data representing the selection of the at least one first media item, cause the at least one first media item to be added to a first playback queue corresponding to one or more first playback devices for later playback, wherein a plurality of first playback devices are connected to a first local area network, wherein the plurality of first playback devices includes the one or more first playback devices, wherein the first playback devices send timing information via the first local area network when synchronizing playback, and wherein the user device is outside of the first local area network;
receive, via the web browser, second input data representing selection of at least one second media item from among the media items graphically represented on the webpage; and
according to the received second input data representing the selection of the at least one second media item, cause the at least one second media item to be added to a second playback queue corresponding to a group of second playback devices for later playback, wherein the plurality of second playback devices are connected to a second local area network, wherein the plurality of second playback devices includes the group of second playback devices, wherein the second playback devices send timing information via the second local area network when synchronizing playback, and wherein the user device is outside of the second local area network.

2. The system of claim 1, wherein the at least one first media item comprises an Internet radio station, and wherein the program instructions that are executable by the at least one processor such that the system is configured to cause the at least one first media item to be added to the first playback queue comprise program instructions that are executable by the at least one processor such that the system is configured to:

cause the Internet radio station to be queued for playback.

3. The system of claim 1, wherein the at least one first media item comprises a playlist of audio tracks, and wherein the program instructions that are executable by the at least one processor such that the system is configured to cause the at least one first media item to be added to the first playback queue comprise program instructions that are executable by the at least one processor such that the system is configured to:

cause the playlist of audio tracks to be queued for playback.

4. The system of claim 1, wherein a particular first playback of the one or more first playback devices comprises the first playback queue, and wherein the program instructions that are executable by the at least one processor such that the system is configured to cause the at least one first media item to be added to the first playback queue comprise program instructions that are executable by the at least one processor such that the system is configured to:

cause the particular first playback device to add the at least one first media item to the first playback queue.

5. The system of claim 1, wherein a designated computing device other than the one or more first playback devices comprises the first playback queue, and wherein the program instructions that are executable by the at least one processor such that the system is configured to cause the at least one first media item to be added to the first playback queue comprise program instructions that are executable by the at least one processor such that the system is configured to:

cause the designated computing device to add the at least one first media item to the first playback queue.

6. The system of claim 1, wherein the first local area network corresponds to a commercial location, wherein the one or more first playback devices include multiple first playback devices associated with a first room of the commercial location, wherein one or more third playback devices are associated with a second room of the commercial location; and wherein the one or more third playback devices are connected to the first local area network.

7. The system of claim 6, wherein the at least one non-transitory computer-readable medium further comprises program instructions that are executable by the at least one processor such that the system is configured to:

cause the web browser to display a graphical representation of the first room in association with a graphical representation of the first playback queue.

8. The system of claim 1, wherein the at least one non-transitory computer-readable medium further comprises program instructions that are executable by the at least one processor such that the system is configured to:

cause the web browser to display one or more elements configured to receive account credentials;

receive, via the web browser, data representing a particular set of account credentials for a cloud service;

identify a plurality of playback devices registered with a user account corresponding to the particular set of account credentials, wherein the plurality of playback devices comprises the one or more first playback devices and the group of second playback devices; and cause the web browser to display a graphical representation of at least a portion of the plurality of playback devices; and receive, via the web browser, input data representing selection of the one or more first playback devices from among the plurality of playback devices.

9. The system of claim 1, wherein the at least one non-transitory computer-readable medium further comprises program instructions that are executable by the at least one processor such that the system is configured to:

after the at least one first media item to be added to the first playback queue, receive via the web browser, third input data representing a command to start playback of the first playback queue.

10. At least one non-transitory computer-readable medium comprising program instructions that are executable by at least one processor such that a system is configured to:

cause, via a wide area network, a web browser on a user device to display a webpage comprising graphical representations of media items of a streaming audio service;

receive, via the web browser, first input data representing selection of at least one first media item from among the media items graphically represented on the webpage;

according to the received first input data representing the selection of the at least one first media item, cause the at least one first media item to be added to a first playback queue corresponding to one or more first playback devices for later playback, wherein a plurality of first playback devices are connected to a first local area network, wherein the plurality of first playback devices includes the one or more first playback devices, wherein the first playback devices send timing information via the first local area network when synchronizing playback, and wherein the user device is outside of the first local area network;

receive, via the web browser, second input data representing selection of at least one second media item from among the media items graphically represented on the webpage; and according to the received second input data representing the selection of the at least one second media item, cause the at least one second media item to be added to a second playback queue corresponding to a group of second playback devices for later playback, wherein the plurality of second playback devices are connected to a second local area network, wherein the plurality of second playback devices includes the group of second playback devices, wherein the second playback devices send timing information via the second local area network when synchronizing playback, and wherein the user device is outside of the second local area network.

11. The at least one non-transitory computer-readable medium of claim 10, wherein the at least one first media item comprises an Internet radio station, and wherein the program instructions that are executable by the at least one processor such that the system is configured to cause the at least one first media item to be added to the first playback queue comprise program instructions that are executable by the at least one processor such that the system is configured to:
    cause the Internet radio station to be queued for playback.

12. The at least one non-transitory computer-readable medium of claim 10, wherein the at least one first media item comprises a playlist of audio tracks, and wherein the program instructions that are executable by the at least one processor such that the system is configured to cause the at least one first media item to be added to the first playback queue comprise program instructions that are executable by the at least one processor such that the system is configured to:
    cause the playlist of audio tracks to be queued for playback.

13. The at least one non-transitory computer-readable medium of claim 10, wherein a particular first playback of the one or more first playback devices comprises the first playback queue, and wherein the program instructions that are executable by the at least one processor such that the system is configured to cause the at least one first media item to be added to the first playback queue comprise program instructions that are executable by the at least one processor such that the system is configured to:
    cause the particular first playback device to add the at least one first media item to the first playback queue.

14. The at least one non-transitory computer-readable medium of claim 10, wherein a designated computing device other than the one or more first playback devices comprises the first playback queue, and wherein the program instructions that are executable by the at least one processor such that the system is configured to cause the at least one first media item to be added to the first playback queue comprise program instructions that are executable by the at least one processor such that the system is configured to:
    cause the designated computing device to add the at least one first media item to the first playback queue.

15. The at least one non-transitory computer-readable medium of claim 10, wherein the first local area network corresponds to a commercial location, wherein the one or more first playback devices include multiple first playback devices associated with a first room of the commercial location, wherein one or more third playback devices are associated with a second room of the commercial location; and wherein the one or more third playback devices are connected to the first local area network.

16. The at least one non-transitory computer-readable medium of claim 15, wherein the at least one non-transitory computer-readable medium further comprises program instructions that are executable by the at least one processor such that the system is configured to:
    cause the web browser to display a graphical representation of the first room in association with a graphical representation of the first playback queue.

17. The at least one non-transitory computer-readable medium of claim 10, wherein the at least one non-transitory computer-readable medium further comprises program instructions that are executable by the at least one processor such that the system is configured to:
    cause the web browser to display one or more elements configured to receive account credentials;
    receive, via the web browser, data representing a particular set of account credentials for a cloud service;
    identify a plurality of playback devices registered with a user account corresponding to the particular set of account credentials, wherein the plurality of playback devices comprises the one or more first playback devices and the group of second playback devices; and
    cause the web browser to display a graphical representation of at least a portion of the plurality of playback devices; and
    receive, via the web browser, input data representing selection of the one or more first playback devices from among the plurality of playback devices.

18. The at least one non-transitory computer-readable medium of claim 10, wherein the at least one non-transitory computer-readable medium further comprises program instructions that are executable by the at least one processor such that the system is configured to:
    after the at least one first media item to be added to the first playback queue, receive via the web browser, third input data representing a command to start playback of the first playback queue.

19. A method comprising:
    causing, via a wide area network, a web browser on a user device to display a webpage comprising graphical representations of media items of a streaming audio service;
    receiving, via the web browser, first input data representing selection of at least one first media item from among the media items graphically represented on the webpage;
    according to the received first input data representing the selection of the at least one first media item, causing the at least one first media item to be added to a first playback queue corresponding to one or more first playback devices for later playback, wherein a plurality of first playback devices are connected to a first local area network, wherein the plurality of first playback devices includes the one or more first playback devices, wherein the first playback devices send timing information via the first local area network when synchronizing playback, and wherein the user device is outside of the first local area network;
    receiving, via the web browser, second input data representing selection of at least one second media item from among the media items graphically represented on the webpage; and
    according to the received second input data representing the selection of the at least one second media item, causing the at least one second media item to be added to a second playback queue corresponding to a group of second playback devices for later playback, wherein the plurality of second playback devices are connected to a second local area network, wherein the plurality of second playback devices includes the group of second playback devices, wherein the second playback devices send timing information via the second local area network when synchronizing playback, and wherein the user device is outside of the second local area network.

20. The method of claim 19, further comprising:
    causing the web browser to display one or more elements configured to receive account credentials;
    receiving, via the web browser, data representing a particular set of account credentials for a cloud service;
    identifying a plurality of playback devices registered with a user account corresponding to the particular set of account credentials, wherein the plurality of playback devices comprises the one or more first playback devices and the group of second playback devices; and
    causing the web browser to display a graphical representation of at least a portion of the plurality of playback devices; and receiving, via the web browser, input data representing selection of the one or more first playback devices from among the plurality of playback devices.

\* \* \* \* \*